US005615271A

United States Patent [19]

Stevens et al.

[11] Patent Number: 5,615,271

[45] Date of Patent: Mar. 25, 1997

[54] METHOD AND APPARATUS FOR ACTIVATING SWITCHES IN RESPONSE TO DIFFERENT ACOUSTIC SIGNALS

[75] Inventors: Carlile R. Stevens, Horseshoe Bay, Tex.; Dale E. Reamer, Lafayette, Calif.

[73] Assignee: Joseph Enterprises, San Francisco, Calif.

[21] Appl. No.: 504,003

[22] Filed: Jul. 19, 1995

Related U.S. Application Data

[63] Continuation of Ser. No. 58,727, May 7, 1993, Pat. No. 5,493,618.

[51] Int. Cl.[6] ........ H04B 1/00

[52] U.S. Cl. ........ 381/110; 381/56

[58] Field of Search ........ 381/110, 56, 7; 367/197–199

[56] References Cited

U.S. PATENT DOCUMENTS

| | | | |
|---|---|---|---|
| 4,192,979 | 3/1980 | Janowski, Jr. | 381/110 |
| 4,207,959 | 6/1980 | Youdin et al. | 381/110 |
| 4,513,189 | 4/1985 | Ueda et al. | 381/110 |
| 4,641,292 | 2/1987 | Tunnell et l. | 367/198 |
| 4,856,072 | 8/1989 | Schneider et al. | 381/110 |
| 5,130,950 | 7/1992 | Orban et al. | 367/34 |
| 5,199,080 | 3/1993 | Kimura et al. | 381/110 |
| 5,493,618 | 2/1996 | Stevens et al. | 381/110 |

OTHER PUBLICATIONS

Product Advertisement for The Clapper™, Joseph Enterprises, Inc.

Videotape of thirty (30) second and sixty (60) second television commercials for The Claper™, Joseph Enterprises, Inc.

*Primary Examiner*—Stephen Brinich

*Attorney, Agent, or Firm*—Townsend and Townsend and Crew LLP

[57] ABSTRACT

An acoustic switch device that independently operates two or more electrical appliances. The acoustic switch operates a first electrical appliance upon receipt of a first series of acoustic signals and operates a second electrical appliance upon receipt of a second series of acoustic signals that is different from the first series of acoustic signals.

12 Claims, 5 Drawing Sheets

METHOD AND APPARATUS FOR ACTIVATING SWITCHES IN RESPONSE TO DIFFERENT ACOUSTIC SIGNALS

This is a continuation of application Ser. No. 08/058,727 filed May 7, 1993, now U.S. Pat. No. 5,493,618, issued Feb. 20, 1996.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

The present invention relates generally to a sound activated switch. More specifically, the present invention relates to a sound activated switch that independently operates two or more electrical appliances by activating power switches after detecting different series of audio signals.

BACKGROUND OF THE INVENTION

In today's society convenience is almost a necessity. Manufacturers gear entire product lines to satisfy society's need for convenience. One common market that manufacturers have targeted with convenience in mind has been the market for electric and electronic appliances. Many people will elect not to use an electrical appliance such as a television or light, if they must walk across a room to turn the television or light ON. Thus, manufacturers have developed devices that remotely control and operate almost all electronic appliances.

Unfortunately, most remotely controlled appliances require a person to possess a remote control unit to operate the appliance. The requirement of possession in itself can be a major inconvenience. Often a person must walk across a room to retrieve the remote control unit, and frequently it may be misplaced, which, at best, requires extra time and effort to find.

To solve the problems associated with hand-held remote control units, some manufacturers have developed sound activated switches. There are a number of sound activated switches available for sale. Typically these devices turn electrical appliances ON and OFF in response to a specific sound. Some sound activated switches operate from hand-held sound generators. These devices, however, suffer from the same problem as other remote control units—possession of the controller is required before it can be used. Other sound activated devices operate in response to sounds physically produced by a person such as two closely spaced claps. These devices are very useful in solving the problems associated with the previously described remote control units and are especially useful to handicapped persons who have difficulty moving around a room.

However, one disadvantage associated with some of the currently available devices that are activated by hand-clapping or similar sound signals is that only a single sound-activated switch can operate in any given room unless all the controlled electrical accessories in that room are to be turned ON at the same time. Even in this case, one sound-activated switch may be slightly more sensitive than another or the switches may be placed in such a position that a series of hand claps will operate only one of the switches in the room. Thus, if a person tries a second time to operate a sound activated switch that did not activate the first time, the first switch may switch an appliance back ON when the second switch switches an appliance OFF.

Additionally, some prior art devices require manual adjustment to the acoustics of a room to function properly. If an inexperienced operator does not make the adjustments properly, appliances could be turned ON and OFF by unintended control signals, which is both frustrating and annoying.

SUMMARY OF THE INVENTION

The present invention solves the problems associated with the prior art by providing an acoustic switch that is operable without requiring a sound generating unit and that is able to independently operate two or more electronic appliances. A preferred embodiment of the present invention is an acoustic switch that is able to control two electrical appliances by recognizing and distinguishing between different preprogrammed series of acoustic signals such as hand-clapping sounds. The acoustic switch can independently operate the two electrical appliances by operating one appliance on recognition of a first series of acoustic signals and the second appliance on recognition of a second series of acoustic signals.

Another advantage of the present invention is that it provides for the manual selection of operating modes. In addition to its normal operating mode, the acoustic switch is operable in an away/intruder mode and in a learn mode. In the away/intruder mode, the acoustic switch will switch appliances ON upon the detection of any noise, while the absence of noise for a specified period of time will cause the acoustic switch to switch the appliances OFF.

In learn mode, it is possible to teach the invention, through its microcontroller, to remember a specific sequence of claps to operate one or more appliances. The acoustic switch can be programmed to operate in response to many different clap sequences. For example, two to five claps, or two claps then a pause and a third clap, or any combination of claps and pauses, can activate an appliance. Once the acoustic switch has been programmed to the desired clap sequence and placed in its normal operating mode, it will activate only to the newly learned sequence. In one embodiment of the present invention, the acoustic switch produces an audible beep to alert the user that the switch has successfully learned a new clap sequence.

In one embodiment, the present invention is configured as a small plastic housing that plugs directly into a wall outlet. Additional outlets on the box permit the attachment of two appliances, such as lamps, televisions, or fans. In the simplest mode of operation, two claps will turn one appliance ON and OFF, while three claps will turn a second appliance ON and OFF without operating the first appliance. In other embodiments, it is possible for the invention to be designed to independently operate more than two appliances with different clap sequences.

Additionally, the invention is supplied with neon lamps that indicate when an appliance that is turned ON is connected to the acoustic switch.

The features and advantages of an acoustic switch according to the present invention will be more clearly understood from the following description taken in conjunction with the accompanying drawings.

DETAILED DESCRIPTION OF THE INVENTION

Figure 1:
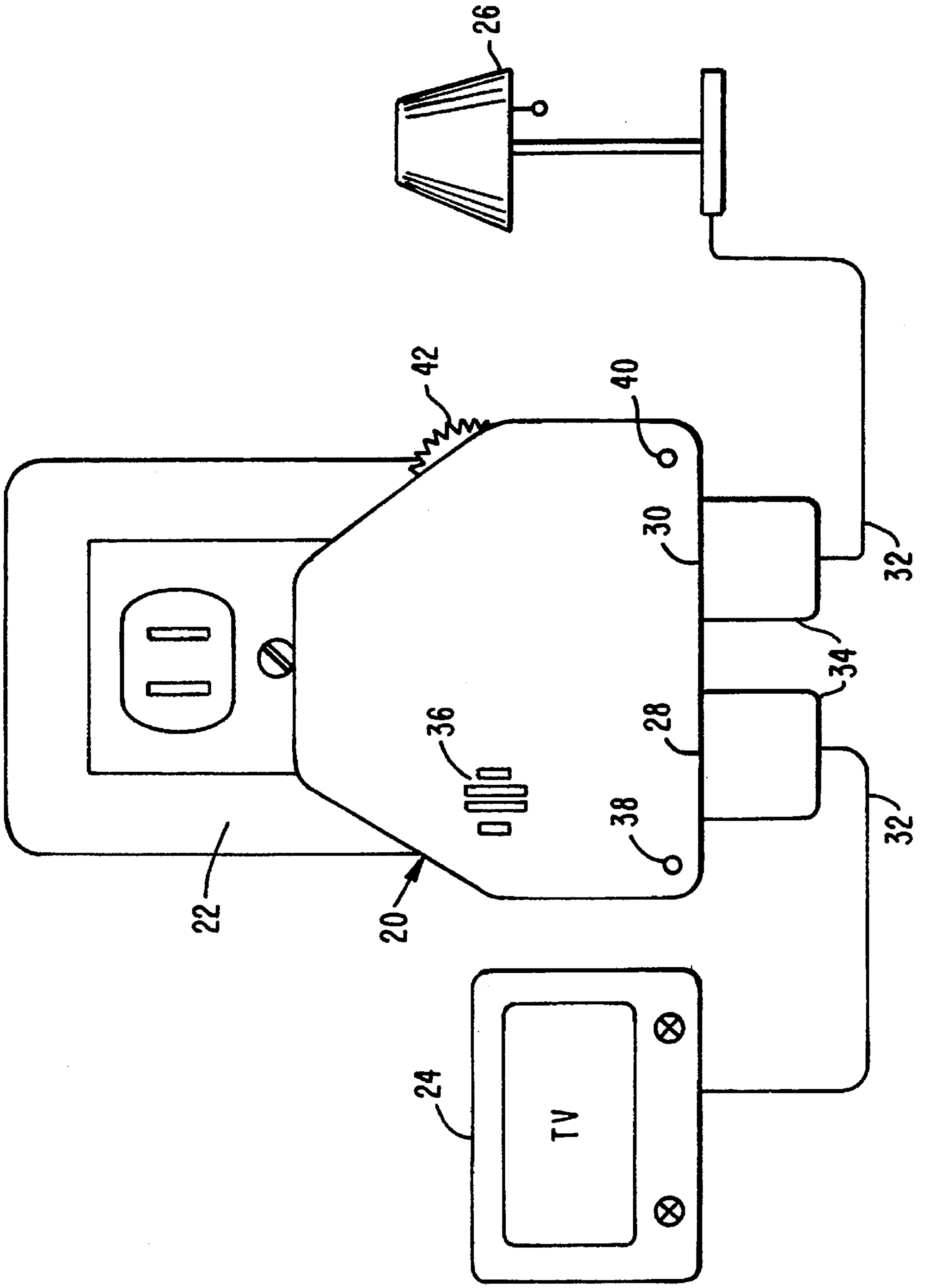
FIG. 1 is a perspective view of a preferred embodiment of the acoustic switch according to the present invention.

FIG. 1 is a perspective view of a preferred embodiment of an acoustic switch 20 according to the present invention. Acoustic switch 20 is used to independently operate two electrical appliances. As shown in FIG. 1, acoustic switch 20 plugs into a conventional electrical wall outlet 22. Electrical appliances 24 and 26 are then plugged into receptacles 28 and 30 using electric line cords 32 and plugs 34.

A microphone placed behind a microphone opening 36 receives acoustic signals from an area surrounding acoustic switch 20. Upon receipt of a specific first series of acoustic signals, acoustic switch 20 operates appliance 24 by supplying or depriving the appliance of electricity thus switching it ON or OFF. Upon receipt of a specific second series of acoustic signals, different from the first series, acoustic switch 20 operates appliance 26 by switching the appliance ON or OFF.

Indicators 38 and 40 indicate whether appliances 24 and 26 are plugged into receptacles 28 and 30, respectively. When appliances 24 and 26 are connected to receptacles 28 and 30, respectively, indicators 38 and 40, will be illuminated if the appliance is turned ON and acoustic switch 20 has switched it OFF.

Mode selector switch 42 allows a user to set the acoustic switch in one of two operating modes: normal operating mode or away/intruder mode. In a second embodiment of the present invention, mode selector 42 allows a user to set the acoustic switch in a learn mode in addition to the normal and away/intruder modes.

Figure 2:
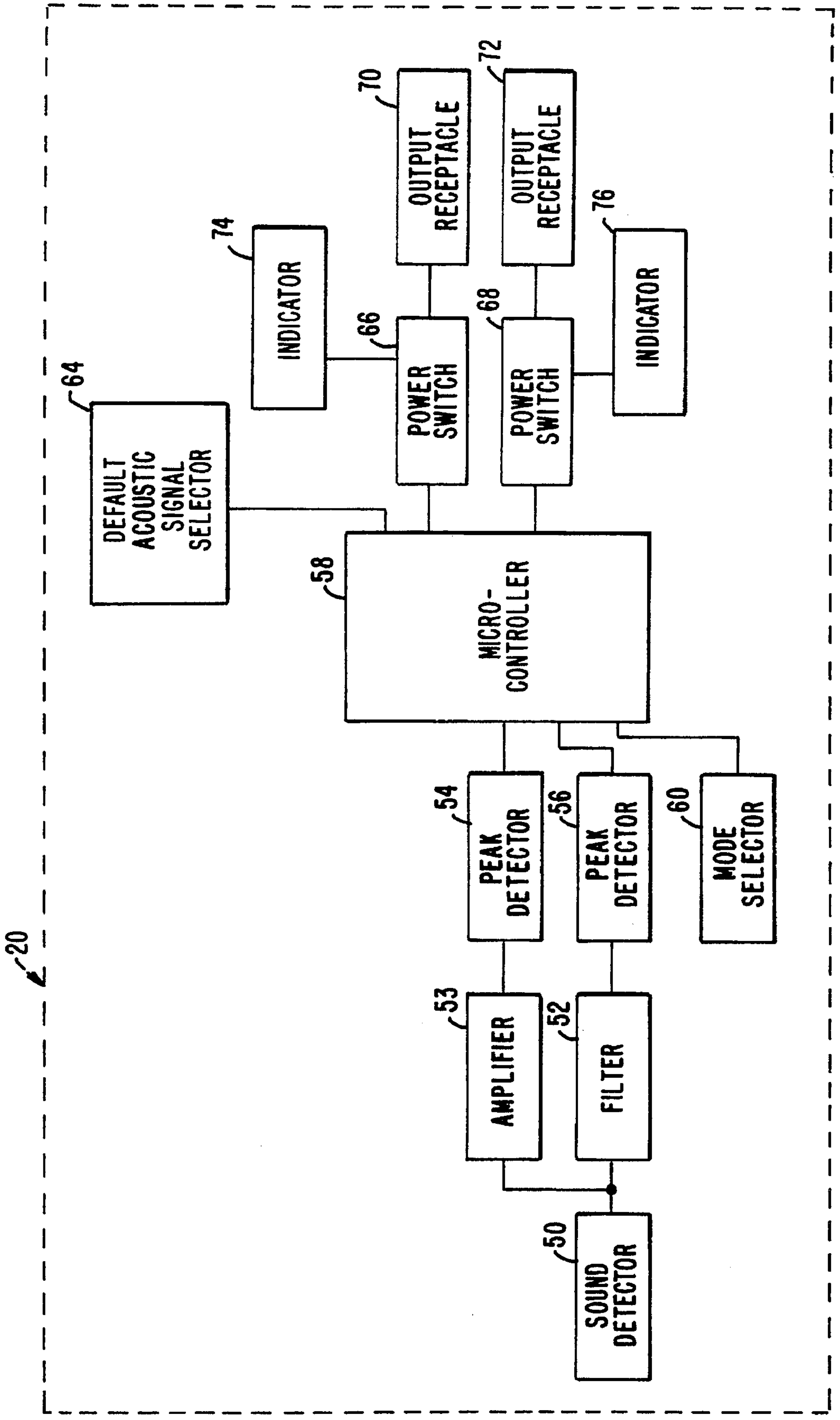
FIG. 2 is a block diagram of the electronic circuit of the embodiment of FIG. 1.

FIG. 2 is a block diagram of one embodiment of the electronic circuit for acoustic switch 20 depicted in FIG. 1. The electronic circuit for acoustic switch 20 comprises a sound detector 50, a filter 52, an amplifier 53, peak detectors 54 and 56, a microcontroller 58, a mode selector 60, a default acoustic signal selector 64, power switches 66 and 68, output receptacles 70 and 72, and indicator lamps 74 and 76.

Microcontroller 58 is a programmable microcontroller that comprises an analog-to-digital converter, a timer, a ROM memory, and a RAM memory.

Sound detector 50 has an output coupled to an input of filter 52 and an input of amplifier 53 which has an output coupled to an input of peak detector 54. An output of filter 52 is coupled to an input of peak detector 56. Peak detectors 54 and 56 both have outputs coupled to respective inputs of the analog-to-digital converter of microcontroller 58. Microcontroller 58 has an input coupled to mode selector 60 and an input coupled to an output of default acoustic signal selector 64. Microcontroller 58 also has outputs coupled to inputs of power switches 66 and 68. Power switches 66 and 68 have outputs coupled to output receptacles 70 and 72 and outputs coupled to indicators 74 and 76, respectively.

The operation of one embodiment of acoustic switch 20 is as follows. Acoustic signals are detected at sound detector 50, which converts the acoustic signals into electrical signals. The electrical signal output of sound detector 50 is simultaneously fed into filter 52 and amplifier 53.

Filter 52 is a bandpass filter that amplifies the output of sound detector 50 and filters electrical signals corresponding to sounds outside the frequency range of 2200 to 2800 hertz, which is the predominate frequency range of a typical hand clap. The output of filter 52 is fed into peak detector 56 which detects and holds the peak amplitudes of the signal output from filter 52. The analog output of peak detector 56 is then input to an analog input of microcontroller 58 where it is converted to a digital signal.

Amplifier 53 amplifies the unfiltered output of sound detector 50. Peak detector 54 detects and holds the peak amplitudes of the amplified, unfiltered signal output from sound detector 50, and the analog output of peak detector 56 is input to a second analog input of microcontroller 58 where it is converted to a digital signal. The output of peak detector 54 is used in detecting noise during the away/intruder mode, while the output of peak detector 56 is used to detect sounds associated with claps. In another embodiment, the two signals output from peak detectors 54 and 56 can be compared to allow microcontroller 58 to adjust its sensitivity to background noise.

Microcontroller 58 receives input signals from mode selector 60 and default acoustic signal selector 64. Mode selector 60 is a two position switch that allows a user to choose to operate acoustic switch 20 in one of two operating modes that include a normal operating mode and an away/intruder mode. In other embodiments mode selector 60 can be a potentiometer or similar device.

Default acoustic signal selector 64 is a jumper that can be positioned in two different positions. In the first position, default acoustic signal selector 64 causes acoustic switch 20 to operate power switch 66 on a two-clap sequence and power switch 68 on a three-clap sequence. In the second position, default acoustic signal selector 64 causes acoustic switch 20 to operate power switch 66 on a three-clap sequence and power switch 68 on a four-clap sequence. Another embodiments of the present invention does not include a default acoustic signal selector and thus does not allow a choice of which clap sequences operate appliances. While still other embodiments include default acoustic signal selectors that have three or more positions allowing a user to select from three or more different sets of claps sequences to operate appliances.

Microcontroller 58 controls the operation of power switches 66 and 68. Microcontroller 58 outputs signals that operate power switches 66 and 68 and enable the switches to operate electrical appliances plugged into output receptacles 70 and 72, respectively.

Indicator 74 is a neon lamp coupled across power switch 66 that lights up to indicate when an appliance connected at output receptacle 70 is turned ON but switched OFF by acoustic switch 20. Indicator 76 is a neon lamp coupled across power switch 68 that lights up to indicate when an appliance connected at output receptacle 72 is turned ON but switched OFF by acoustic switch 20. Other embodiments of the present invention can use light emitting diodes or similar devices in place of the neon lamps.

Figure 3:
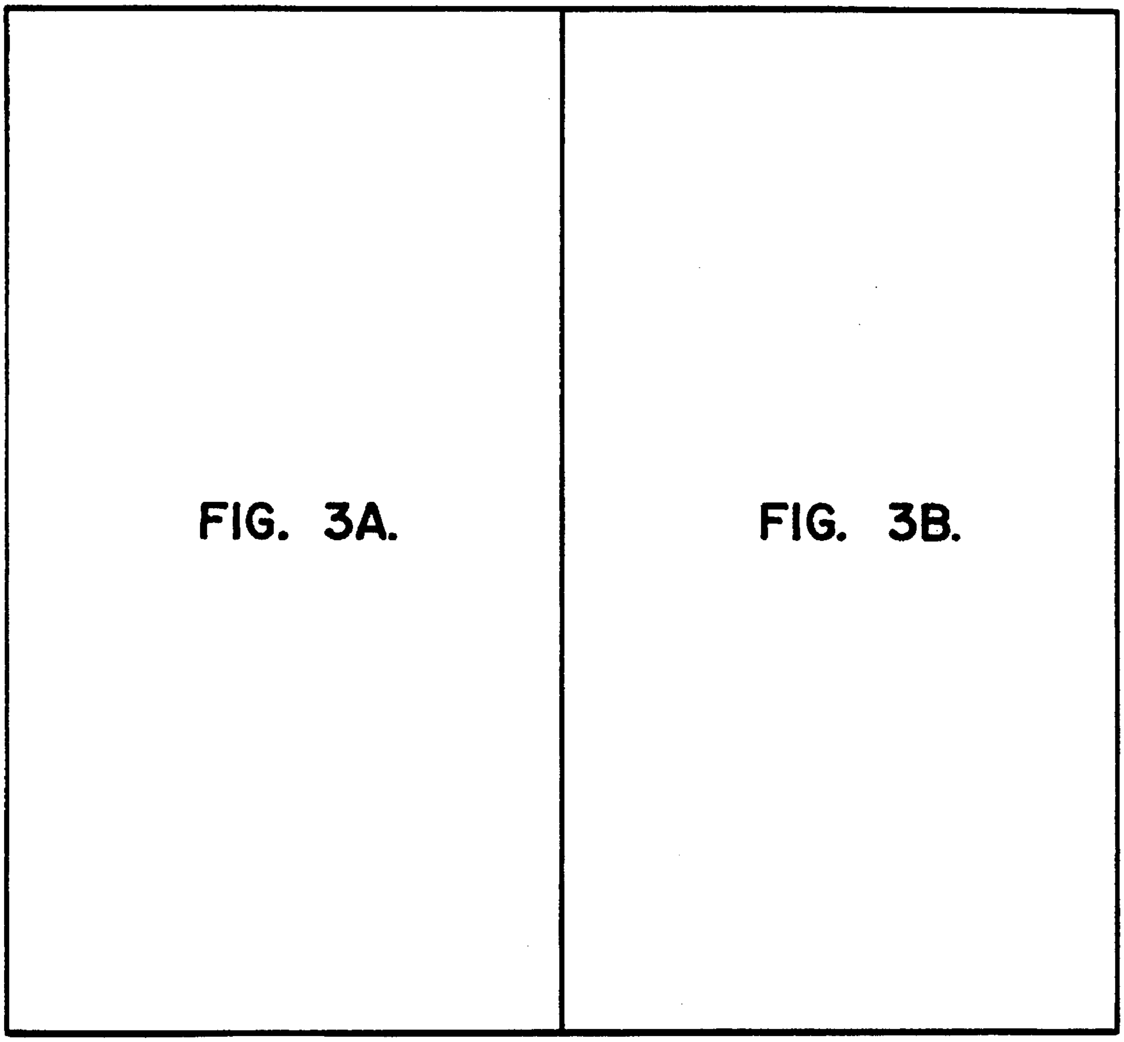
FIG. 3 is a flowchart of the functionality of the software program that controls one embodiment of the present invention.
Figure 3A:
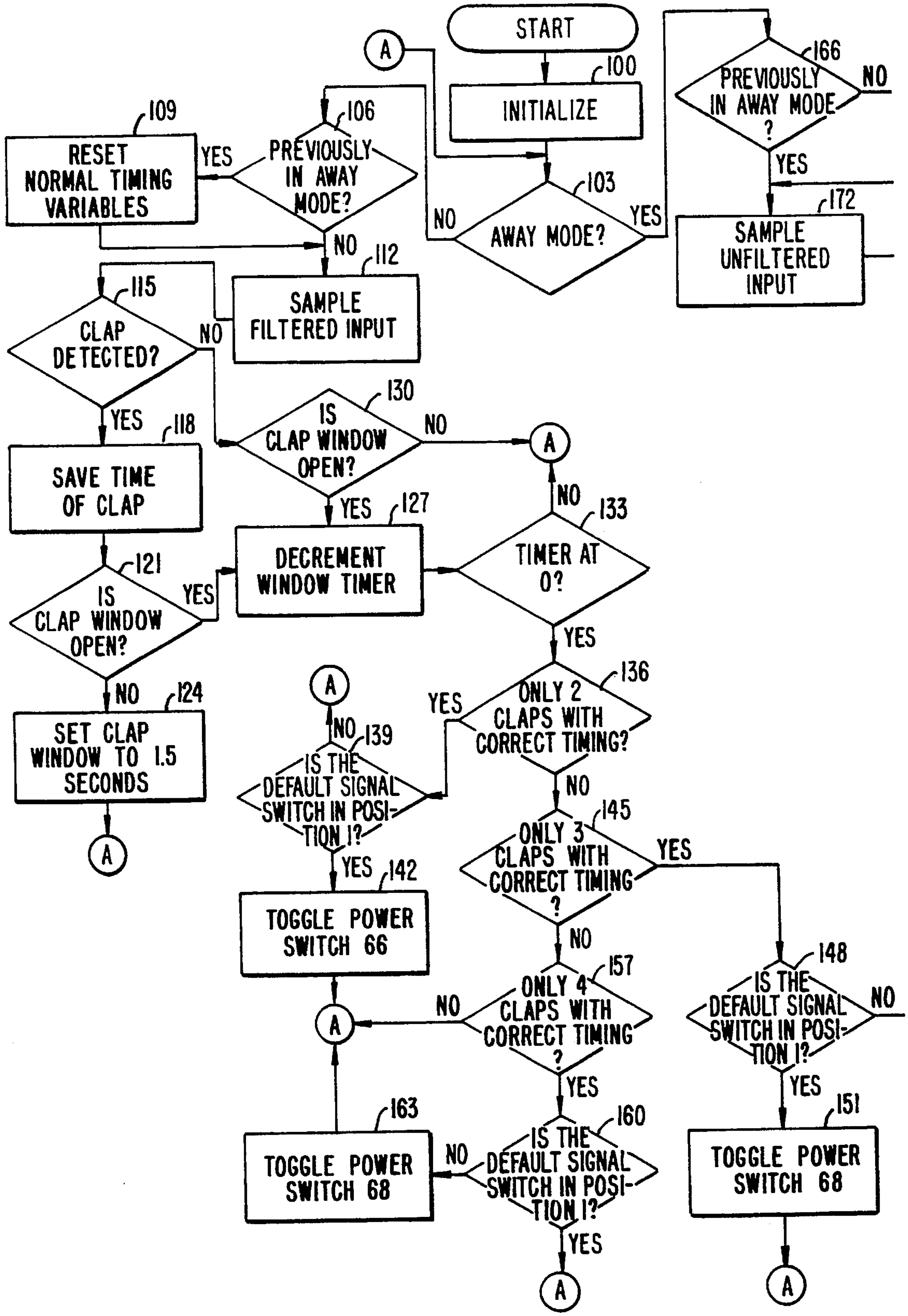
Figure 3B:
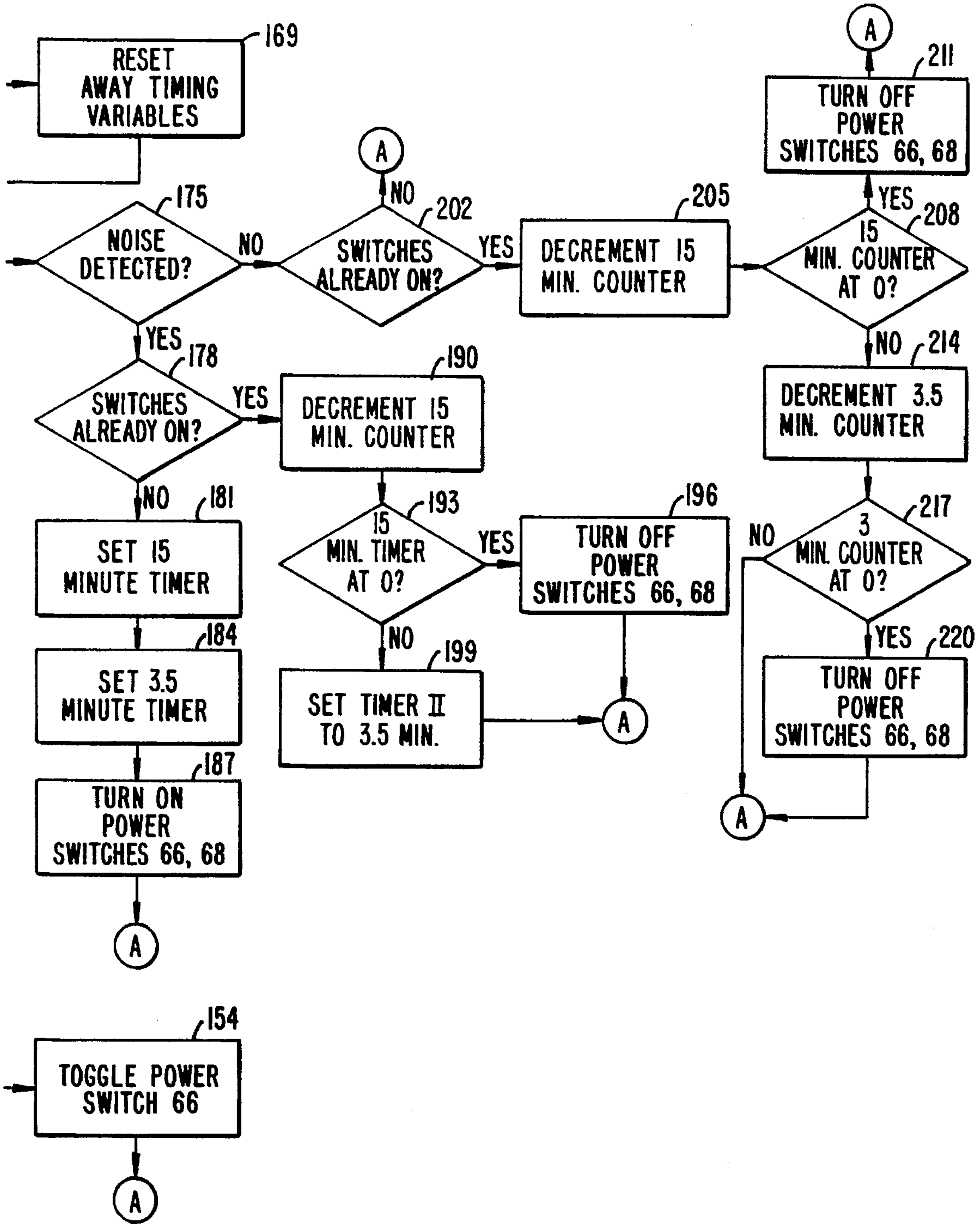

FIG. 3 is a flowchart of the functionality of the acoustic switch system according to one embodiment of the present invention. Upon startup, the system performs an initialization routine in block 100. The initialization routine includes the steps of setting up variables that are not time-dependent, determining if the AC lines being used by acoustic switch 20 are 50 or 60 Hertz, and setting up all time-dependent variables based on the line frequency. In block 103, the system determines if acoustic switch 20 is operating in away/intruder mode or normal mode by examining mode selector 60.

When acoustic switch 20 is operating in normal mode, a first series of claps will operate power switch 66 and a second series of claps, different than the first series, will operate power switch 68. When acoustic switch 20 is in away/intruder mode, any frequency sound of sufficient intensity will activate both power switches 66 and 68.

In normal mode, block 106 checks to see if acoustic switch 20 was operating in away/intruder mode last time the system checked the mode. This would be the case if mode selector 60 was just switched to normal mode. If acoustic switch 20 was previously operating in away/intruder mode, all timing variables used in normal mode are reset to default values by block 109. At block 112, the output of sound detector 50 after it passes through filter 52 and peak detector 56 is sampled.

In block 115, the signal from block 112 is analyzed to determine if a clap occurred. In determining if a clap occurred, the system looks at the first instant the sampled input rises above a minimum threshold clap level of 1.28 volts. This threshold level is exceeded when sound detector 50 produces an output voltage of 466 microvolts in response to the presence of a clap sound at the input of sound detector 50. If, after 200 milliseconds, the sampled input is above the threshold clap level two or more times before the next clap occurs, the first clap is rejected as noise. Otherwise, it is a valid clap.

If the processor detects that a clap sound has been detected in block 115, the time the clap occurred is saved in block 118. The system then checks to see if previous claps have been detected in block 121, which means that the clap window is already open. The clap window is a 1.5 second time interval that starts with the detection of a first clap. Acoustic switch 20 counts the number of claps that occur during the 1.5 second clap window when determining if an actionable clap sequence is detected. If this is the first clap, then the clap window timer is set to 1.5 seconds and other timing variables are set in block 124. If this is not the first clap, the clap window timer and other timing variables are decremented in block 127.

If no clap is detected in block 115, the system checks to see if the clap window timer is already on in block 130. If not, the system returns to block 103. Otherwise, the clap window timer and other timing variables are decremented in block 127. Block 133 checks whether the clap window timer has expired. If it has not, the system returns to block 103. If the clap window has expired, the system proceeds to determine if an actionable clap sequence was detected.

In block 136, the system checks to see if two and only two claps were recorded during the clap window, and if the claps were correctly spaced. Acoustic switch 20 counts the number of claps that occur during the clap window and calculates how far the claps are spaced apart. For the two-clap check to be affirmative, acoustic switch 20 must detect two and only two claps during the clap window and the two claps must be spaced 584±217 milliseconds apart.

If there were exactly two correctly timed claps, the system examines default acoustic signal selector 64 in block 139. If default acoustic signal selector is in position 1, power switch 66 is toggled in block 142. To toggle a power switch, the system checks whether it is already ON. If the power switch is ON, it is turned OFF; and if the power switch is OFF, it is turned ON. After power switch 66 is toggled, the system returns to block 103. If default acoustic signal selector 64 is not in position 1, it is in position 2. The clap sequence is then rejected as an invalid clap sequence, and the system loops back to block 103.

In block 145, the system checks to see if three appropriately timed claps were recorded during the clap window. The first step in determining if the three-clap check is affirmative, is to determine if exactly three claps were recorded during the clap window. If exactly three claps were not recorded, the three-clap check of block 145 fails. If three claps were recorded, the second step is to determine if the claps were correctly spaced. The system calculates the shortest time gap between any two of the claps and then uses that gap as a reference time, X. For the three-clap check to be affirmative, all three claps must be spaced X±217 milliseconds apart. If the three claps are not correctly timed, block 145 fails. If the timing of the three claps is correct, default acoustic signal selector 64 is examined in block 148. When default acoustic signal selector 64 is set to position 1, power switch 68 is toggled in block 151. Otherwise, default acoustic signal selector 64 is at position 2 and power switch 66 is toggled in block 154. After toggling either power switch 66 or power switch 68, the system loops back to block 103.

In block 157, the system checks to see if exactly four claps were recorded. The first step in determining if the four-clap check is affirmative, is to determine if exactly four claps were recorded during the clap window. If four claps were not recorded, the four-clap check of block 157 fails. If four claps were recorded, the second step is to determine if the claps were correctly spaced. The system calculates the shortest time gap between any two of the claps and then uses that gap as a reference time, X. For the four-clap check to be affirmative, all four claps must be spaced X±217 milliseconds apart. If the four claps are not correctly timed, block 157 fails. If the timing of the four claps is correct, default acoustic signal selector 64 is examined in block 160. When default acoustic signal selector 64 is set to position 1, the sound sequence is rejected and the system returns to block 103. Otherwise, default acoustic signal selector 64 is at position 2 and power switch 68 is toggled in block 163. Next, the system loops back to block 103.

If only one clap or more than four claps were recorded during the clap window, the clap sequence is rejected and the system returns to block 103.

When acoustic switch 20 is operating in the away/intruder mode, block 166 checks if mode selector switch 60 was just switched. If it was, block 169 resets all the timing variables used in the away/intruder mode, turns OFF power switches 66 and 68, and prevents a noise from activating the power switches for one full second. At block 172, the unfiltered output of sound detector 50 is sampled after it passes through peak detector 54.

Block 175 determines if acoustic switch 20 detects a noise of sufficient signal strength to activate power switches 66 and 68. In determining if an actionable noise is detected by acoustic switch 20, the system looks at the unfiltered sound input using two different envelopes: a long attack envelope and a short attack envelope. The short attack envelope responds to changes in noise level very rapidly, while the long attack envelope responds to noise level changes slowly. If a sound slowly increases in intensity over a long time period, the short and long attack envelopes will respond almost identically to the sound. Thus, the difference between the two envelopes will be negligible and the impulse will be essentially zero. However, if a sound occurs that has a sharp increase in intensity over a short period of time, the short attack envelope will quickly recognize the increased sound intensity while the long attack envelope will slowly respond to the changed intensity. Therefore, the difference between the two envelopes at a time $T_1$ after the initial sound is detected and at or near the sound's highest intensity level will be large resulting in a large impulse value. If the impulse value (the difference between the envelopes at a given time) is above a minimum threshold level of 400 millivolts, which occurs when sound detector 50 produces an output voltage of 400 microvolts in response to an external noise, an actionable noise is detected.

Block 178 then checks whether or not power switches 66 and 68 are already turned ON. When power switches 66 and 68 are not already ON, block 181 sets a first timer to fifteen minutes, block 184 sets a second timer to approximately three and a half minutes, and block 187 toggles power switches 66 and 68 to turn them ON. The first timer is used because acoustic switch 20 will turn power switches 66 and 68 OFF after fifteen minutes of the first noise being detected even if continuous noise is detected throughout the fifteen minute period. The second timer is used because acoustic switch 20 will turn power switches 66 and 68 OFF if after three and a half minutes from detecting a noise, no other noise is detected. After setting up the timers and switching power switches 66 and 68 ON, the system loops back to block 103.

When power switches 66 and 68 are already ON, block 190 decrements the fifteen minute timer. Block 193 then checks whether the 15 minute timer has timed out. If it has, block 196 toggles power switches 66 and 68 to turn them OFF and keeps them OFF for one full second. The system then loops back to block 103. If the fifteen minute timer has not expired, block 199 resets the three and a half minute timer, and the system returns to block 103.

If no noise or a noise of an insufficient level is detected at block 175, block 202 checks whether power switches 66 and 68 are already ON. If they are not ON, the system loops back to block 103. If power switches 66 and 68 are already ON, the fifteen minute timer is decremented by block 205. Block 208 examines whether the fifteen minute timer has expired. If it has, block 211 toggles power switches 66 and 68 to OFF and waits for one complete second before allowing any further noise to activate power switches 66 and 68. The system then returns to block 103.

If the fifteen minute timer has not expired in block 205, block 214 decrements the three and a half minute timer. Block 217 then checks whether the three and a half minute timer has expired. If the three and a half minute timer has expired, block 220 toggles power switches 66 and 68 to OFF, and the system returns to block 103. Otherwise, if the three and a half minute timer has not expired at block 217, the system simply loops back to block 103.

The present invention uses bilateral triode switches (triacs) for power switches 66 and 68. Thus, the system stored in microcontroller 58 pulses the gate of the triac to turn it ON. The triac must then be continuously pulsed every positive and negative line crossing for it to stay ON. To turn it OFF, the system simply stops pulsing the triac's gate. When turning one of the triacs ON or keeping it ON, the system pulses the triacs gate with a low signal for 4 microseconds then returns the gate to high. Because some applications contain large inductive loads and might be up to 90 degrees out of phase with the line voltage, the system continuously pulses the triac's gates every 250 microseconds for about 4.5. milliseconds after each voltage zero crossing. This ensures that all appliances are properly activated.

Additionally, a microphone is used for sound detector 50 and a three-stage bandpass filter is used for filter 52. Each stage of the three-stage filter has a gain of 14 at 2500 hertz. Thus, the overall gain of filter 52 is 2744 at 2500 hertz. The three-stage filter has an extremely sharp roll-off, however, so that at 2200 or 2800 hertz, the gain of each stage of the amplifier is 0.707 for an overall gain of 0.353. In this embodiment, amplifier 53 has a gain of approximately 1000.

Table 1 illustrates an outline in pseudo code of the main subroutines that make up one embodiment of the software system described in FIG. 3. The program of Table 1 is set up as a sequence of tasks that execute in a continuous loop. The subroutines are timed so that the filtered and unfiltered outputs of sound detector 50 are sampled approximately every millisecond. It also allows for the gates of triacs 66 and 68 to be pulsed every 250 microseconds when the triacs are conducting current.

Attached to the end of the application as Appendix A is a listing of the ROM source code for one embodiment of the program outlined in pseudo code in table 1. The source code is stored in the ROM of microcontroller 58, which is an 8-bit microcontroller chip by SGS Thompson, Model ST 6210. The source code is compiled by the ST6 Macro-assembler, version 3.01—August 1990.

TABLE 1

```
This program is set up so that a sequence of tasks is
executed in a continuous loop. The timing of the tasks is
such that both the filtered and unfiltered inputs to
microcontroller 58 are continuously sampled every
millisecond.
POWER UP
  Execute LINE Subroutine
MAIN LOOP
  Execute TOGGLE Subroutine
  Execute READ Subroutine
  Execute FSOUND Subroutine
  Execute TOGGLE Subroutine
  Execute READ Subrout ne
  Execute ASOUND Subroutine
RETURN TO MAIN LOOP
LINE SUBROUTINE
  Measure time elapsed between zero crossings of line
    voltage for two seconds to determine if line is
    60 or 50 hertz.
  Load all registers related to line timing with
    appropriate values based on line frequency.
  RETURN
TOGGLE SUBROUTINE
  If the toggle counter is loaded and either triac flag
    is set, pulse appropriate triac gate signal low
    for 4 microseconds then return signal high.
  Decrement the toggle counter so that pulses extend to
    4.5 milliseconds beyond each line voltage zero
    crossing.
  RETURN
READ SUBROUTINE
  If positive line voltage half cycle
    Execute TOGGLE Subroutine
    Execute TIME Subroutine
    Execute TOGGLE Subroutine
  RETURN
  If negative line voltage half cycle
    Execute TOGGLE Subroutine
    Execute MODE Subroutine
    Execute COMPARE Subroutine
    Execute TOGGLE Subroutine
```

TABLE 1-continued

```
RETURN
MODE SUBROUTINE
  Determines if Mode Selector 60 is set to
    away/intruder mode or normal mode.
  If normal mode, RETURN
  If away/intruder mode, look at the activate flag from
    the COMPARE subroutine to turn the triacs ON or
    keep the triacs ON -- when turning the triacs
    ON, set the 3.5-minute and 15-minute timers.
  If the triac flags are set and the activate flag was
    not set during the last 3.5-minutes, turn the
    triacs OFF.
  If the triac flags are set and the activate flag is
    set, reset the 3.5-minute timer.
  If the 15 minute timer expires, turn the triacs OFF
for 1 full second before allowing them to be
    reactivated.
  RETURN
FSOUND SUBROUTINE
  Reads voltage value from filtered peak detector
    output and compares to a threshold value.
  If voltage > threshold, starts timer for clap window
    or stores the time of occurrence from a previous
    clap if timer is already started.
  After a 200 msec period from detecting a "clap",
    compare sampled voltage to a calculated value (2
    volts below maximum amplitude).
    If more than 2 values > calculated value occur
      before the next clap, the "clap" is
      rejected as a clap and thought to be only
      noise.
  When the 1.2 second timer for the clap window
    expires, the total number of claps during the
    1.2 second period are counted.
    If 2 claps, separation time = 584 msecs.
    If 3 claps, separation time = the shortest time
      difference between any two of the three
      claps.
    If 4 claps, separation time = the shortest time
      difference between any two of the four
      claps.
    {CLAP calculations are continued in the second
    half the ASOUND subroutine}
  RETURN
TIME SUBROUTINE
  Decrements all timing registers.
  RETURN
ASOUND SUBROUTINE
  Reads voltage level from unfiltered peak detector
    output.
  Calculates short attack, short decay envelope.
  Calculates long attack, long decay envelope.
  Difference between the envelopes is the impulse which
    is used in the COMPARE subroutine.
  {CLAP calculations are then continued from FSOUND}
    If 2 claps separated by separation time ± 160
      msec and default signal selector indicates
      operate on 2 and 3 claps, invert the flag
      for triac 1.
    If 3 claps separated by separation time ± 160
      msec and default signal selector indicates
      operate on 2 and 3 claps, invert the flag
      triac 2; otherwise, invert the flag for
      triac 1.
    If 4 claps separated by SEPARATION TIME ± 160
      msec and default signal selector indicates
      operate on 3 and 4 claps, invert the flag
      for triac 2.
    Else, reject clap sequence.
  RETURN
COMPARE SUBROUTINE
  Looks at the value of the impulse variable from
    ASOUND and counts the number of occurrences of
    the impulse > a threshold value. If there are 4
    or more occurrences of impulse > the threshold,
    the activate flag is set to activate the triacs.
  RETURN
```

The program listed in table 1, comprises eight main subroutines: Line, Toggle, Read, Time, Compare, Mode, Fsound, and Asound. Upon start-up, the program executes the Line subroutine to determine if the AC line frequency is 50 or 60 hertz. After calculating the line frequency, the Line subroutine completes its execution by loading all the registers that hold variables relating to line timing with values based on the line frequency.

Next, the program enters a loop that continuously executes the following subroutines in the respective order: Toggle, Read, Fsound, Toggle, Read, and Asound. The timing of the program is such that the Toggle subroutine is executed approximately every 250 microseconds to ensure that triacs 66 and 68 continuously conduct current if appropriate.

The Toggle subroutine is run to turn triacs 66 and 68 ON and to ensure that they continue to operate until they are turned OFF. When a triac is turned ON, its flag is set in either the Asound or Fsound subroutines. The flag for the ON triac stays set throughout the execution of the program until the triac is to be turned OFF, at which time the triac flag is reset. To turn a triac ON and to keep it ON, the Toggle subroutine continuously pulses the triac's gate low for 4 microseconds every 250 microseconds. The pulses start every time the sinusoidal AC voltage changes polarity, and they continue for a 4.5 millisecond period afterwards. As explained above, this procedure is necessary to ensure that the triacs stay ON when they are operating a large inductive load. The Toggle subroutine uses counters to keep track of all of the necessary time sequences.

After the Toggle subroutine has completed, the Read subroutine is executed. The Read subroutine reads and converts the voltage level from two resistors that are not shown but are coupled to an input of microcontroller 58. The value of the resistors is used to set the time of the time-out function in away/intruder mode. Presently the resistors are sized so that they provide a voltage drop at an input of microcontroller 58. The voltage drop is measured by microcontroller 58 and converted into digital data which sets one of the away/intruder mode timers to 3.5 minutes. By changing the value of the resistors, the value of the 3.5 minute timer can be changed.

The Read subroutine also checks whether the line voltage is a positive half cycle or a negative half cycle. When the line voltage is positive, the following subroutines are executed in order: Toggle, Time, and Toggle again. When the line voltage is negative, the Toggle subroutine is executed followed by Mode, Compare, and then Toggle again.

The Time subroutine is used to decrement all time-based variables, while the Compare subroutine is used to determine if acoustic switch 20 should activate triacs 66 and 68 when operating in the away/intruder mode. The Compare subroutine compares the impulse variable to a threshold value of 0.4 volts. When the impulse variable is greater than the threshold value four or more times in a one second interval, an actionable noise has been detected and the triac flags are set so that the triacs will be activated.

The Mode subroutine determines if acoustic switch 20 is operating in normal mode or away/intruder mode. In normal mode, the program exits from the subroutine without performing further steps. In away/intruder mode, the program examines the activate flag from the Compare subroutine to determine if the triacs should be turned ON. If the triacs are already ON and the Compare subroutine did not set the activate flag during the last three and a half minutes, the triacs are turned OFF. If the Compare subroutine sets the activate flag while the triacs are ON, the three and a half minute timer is reset. Finally, if the fifteen minute timer expires, the Mode subroutine turns the triacs OFF and keeps them OFF for one full second before allowing them to be operated by another noise.

The Fsound subroutine is executed after the completion of the Read subroutine. At this point, the program reads the voltage level from the output of peak detector 56 and compares it to a stored threshold value of 1.28 volts, which is the voltage that would be produced when sound detector 50 produces a 466 microvolt output voltage in response to a clap. If the sampled voltage is greater than the threshold voltage, timing counters used to time clap sequences are loaded if this is the first detected clap; otherwise, the time of occurrence from the first detected clap is stored.

One timing counter is used to time the 1.5 clap window. Another timing counter is used to ensure that after a sound above the threshold level is detected, the program will wait 200 milliseconds before further evaluating the sampled voltage level from peak detector 56. After the 200 millisecond period expires, the sampled voltage level is compared to a calculated voltage value that is 2 volts less than the maximum amplitude. If the sampled voltage is greater than the calculated value at any two points in time after the 200 millisecond period and before the occurrence of the next clap, the first sound is presumed to be noise and is not counted as a clap.

When the timing register tracking the 1.5 second clap window expires, the clap separation time is calculated in the Fsound subroutine. The separation time is used to determine if a sequence of claps are properly separated so that acoustic switch 20 operates power switch 66 or 68. If two claps were counted during the clap window, the separation time is 584 milliseconds. If three or four claps were counted, the shortest time difference between any two of the claps is the clap separation time.

At this point, because of timing considerations, the program returns to the main loop even though there are more calculations to be made in determining if an actionable sequence of claps was detected. The remaining code for clap detection is executed at the end of the Asound routine.

The main timing consideration that prevents the Fsound routine from completely evaluating whether or not an actionable clap sequence is detected is that the Toggle subroutine needs to be executed at this point to ensure any ON triacs continue to operate. After the Toggle subroutine is complete, the Read subroutine is executed again. Finally, the Asound subroutine is executed.

The Asound subroutine reads the voltage level from the output of peak detector 54 and calculates the short attack and long attack envelopes previously discussed. The difference between the two envelopes is referred to as the impulse and is used in the Compare subroutine. After calculating the impulse, the Asound subroutine completes calculations that determine if an actionable series of claps is detected when the clap window expires. The rules to invert a triac flag and thus operate a triac are as follows. If two claps are detected that are separated by 584±217 milliseconds and default acoustic signal selector 64 is in position 1, the flag for triac 66 is inverted. If three claps are detected that are separated by the calculated separation time±217 milliseconds, then the flag for triac 66 is inverted if default acoustic signal selector 64 is in position 1. If it is in position 2, the flag for triac 68 is inverted. Finally, if four claps are detected that are separated by the calculated separation time±217 milliseconds, then the flag for triac 68 is inverted if default acoustic signal selector 64 is in position 2. Otherwise, the clap sequence is incorrect and no action occurs. After determining if a triac flag should be inverted, the program returns to the first line of the main loop to execute the Toggle routine and the this loop continues indefinitely.

Other embodiments of the present invention include an embodiment in which mode selector switch 42 is a three position switch that allows as user to set the acoustic switch in a learn mode in addition to normal and away/intruder modes. Using learn mode, a person could program the acoustic switch to operate on different, user-chosen sequences. For example, four evenly spaced claps could operate a first appliance while two claps, a pause, and a third clap could operate a second appliance.

The default acoustic signal selector used within this embodiment would still allow a user to choose between a default selection of two claps and three claps for operating the first and second appliances, respectively, or a default selection of three claps and four claps for operating the same two appliances. But the default clap sequences are the selected series of acoustic signals that operate the acoustic switch only in the event that the acoustic switch's learn mode is not utilized.

A beeper could be employed to give an audible indication when the acoustic switch is in learn mode and has successfully learned a new clap sequence that will operate either the first or second appliance. The beeper could also be used in away/intruder mode to signal when acoustic switch 20 is about to turn an appliance OFF. Thus, if a person is in the vicinity, he/she could make any noise that would ensure that acoustic switch 20 continues to supply power to the appliance.

A timer could also be employed in normal operating mode to switch an appliance OFF if after a set period of time no noise is detected by acoustic switch 20. This would allow acoustic switch 20 to turn OFF an appliance such as a light when the user of the light walks out of the room and no longer uses the light. And as described above, a beeper could be used to signal when acoustic switch 20 is about to turn the appliance OFF. Additionally, acoustic switch 20 could rapidly turn the appliance ON and OFF to indicate that it is about to turn the appliance OFF.

Having fully described one embodiment of the present invention and several alternatives to that embodiment, many other equivalent or alternative methods of independently operating two or more appliances by an acoustic switch will be apparent to those skilled in the art. These equivalents and alternatives are intended to be included within the scope of the present invention.

APPENDIX A

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
 1
 2 x        .def   080h
 3 y        .def   081h
 4 v        .def   082h
 5 w        .def   083h
 6 a        .def   0ffh,m
 7 adat     .def   0d0h
 8 acr      .def   0d1h
 9 ddra     .def   0c4h
10 dra      .def   0c0h
11 ora      .def   0cch
12 ddrb     .def   0c5h
13 drb      .def   0c1h
14 orb      .def   0c8h
15 wdt      .def   0d8h
16 tscr     .def   0d4h
17 tcr      .def   0d3h
18 ior      .def   0c8h
19 flag     .def   084h
20 fenv     .def   085h
21 tempx    .def   086h
22 asnd     .def   087h
23 aenv     .def   088h
24 fpk      .def   089h
25 apul     .def   08ah
26 apk      .def   08bh
27 ecntr    .def   08ch
28 flpk     .def   08dh
29 flenv    .def   08eh
30 fpulh    .def   08fh
31 alenv    .def   090h
32 tcntr    .def   091h
33 apulh    .def   092h
34 fsnd     .def   093h
35 alpk     .def   094h
36 dup      .def   095h
37 mod      .def   096h
38 fcntr    .def   097h
39 acntr    .def   098h
40 toggle   .def   099h
41 tmin     .def   09ah
42 cyc      .def   09bh   ;cyc
43 sec      .def   09ch
44 bcntrh   .def   09dh
45 bcntrl   .def   09eh
46 cltmer   .def   09fh
47 sflag    .def   0a0h
48 diff     .def   0a1h
49 dpk      .def   0a2h
50 word     .def   0a3h
51 fimp     .def   0a4h
52 aimp     .def   0a5h
53 tempa    .def   0a6h,m
54 tim      .def   0a7h
55 secb     .def   0a8h
56 tcntrb   .def   0a9h
57 cltmerb  .def   0aah
58 togglob  .def   0abh
59 bcntrlb  .def   0ach
60 cntrlb   .def   0adh,m
61 cltb     .def   0aeh
62 cltab    .def   0afh
63 tolb     .def   0b0h
64 cltmerc  .def   0b1h
65 imptim   .def   0b2h
66 impcntr  .def   0b3h
67 nflg     .def   0b8h
68 fdiff    .def   0b9h
69 ncntr    .def   0bah
70 delt     .def   0bbh
71 floor    .def   0bch
72 max      .def   0bdh
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
 73                                         73 dead    .def    0bah
 74                                         74         .org    0880h
 75 P00 0880 0DC4FF  P00 0880               75 start   ldi     ddra,255
 76 P00 0883 0DCCFF  P00 0883               76         ldi     ora,255
 77 P00 0886 0DC0FF  P00 0886               77         ldi     dra,255
 78 P00 0889 0DC500  P00 0889               78         ldi     ddrb,0
 79 P00 088C 0DC18F  P00 088C               79         ldi     drb,143
 80 P00 088F 0DCD00  P00 088F               80         ldi     orb,0
 81 P00 0892 0DD110  P00 0892               81         ldi     acr,16
 82 P00 0895 0DD400  P00 0895               82         clr     tscr
 83 P00 0898 0DC800  P00 0898               83         ldi     ior,0
 84 P00 089B 4D      P00 089B               84         reti
 85 P00 089C 0DD8FE  P00 089C               85         ldi     wdt,254
 86 P00 089F 8BB4    P00 089F               86         res     1,flag
 87 P00 08A1 4B84    P00 08A1               87         res     2,flag
 88 P00 08A3 CB84    P00 08A3               88         res     3,flag
 89 P00 08AS 2B84    P00 08A5               89         res     4,flag
 90 P00 08A7 AB84    P00 08A7               90         res     S,flag
 91 P00 08A9 6B84    P00 08A9               91         res     6,flag
 92 P00 08AB EB84    P00 08AB               92         res     7,flag
 93 P00 08AD 0D8500  P00 08AD               93         clr     fenv
 94 P00 08B0 0D8800  P00 08B0               94         clr     aenv
 95 P00 08B3 0D9000  P00 08B3               95         clr     alenv
 96 P00 08B6 0D8E00  P00 08B6               96         clr     flenv
 97 P00 08B9 0D9300  P00 08B9               97         clr     fsnd
 98 P00 08BC 0D8700  P00 08BC               98         clr     asnd
 99 P00 08BF 0BA0    P00 08BF               99         res     0,sflag
100 P00 08C1 8BA0    P00 08C1              100         res     1,aflag
101 P00 08C3 4BA0    P00 08C3              101         res     2,sflag
102 P00 08CS 2BA0    P00 08C5              102         res     4,sflag
103 P00 08C7 EBA0    P00 08C7              103         res     7,sflag
104 P00 08C9 0BB8    P00 08C9              104         res     0,nflg
105 P00 08CB 4BB8    P00 0SCB              105         res     2,nflg
106 P00 08CD 8BB8    P00 08CD              106         res     1,nflg
107 P00 08CF ABB8    P00 08CF              107         res     5,nflg
108 P00 08D1 0DBD00  P00 08D1              108         clr     max
109 P00 08D4 0DBE3C  P00 08D4              109         ldi     dead,60
110 P00 08D7 0DBA00  P00 08D7              110         clr     ncntr
111 P00 08DA 0DA300  P00 08DA              111         clr     word
112 P00 08DD 0D9A00  P00 08DD              112         clr     tmin
113 P00 08E0 0D96FF  P00 08E0              113         ldi     mod,255
114 P00 08E3 0D9F00  P00 08E3              114         clr     cltmer
115 P00 08E6 0D9100  P00 0SE6              115         clr     tcntr
116 P00 08E9 F1C6    P00 0 8E9             116         call    line    ;50/60Hz
detection subroutine
117                                        117
118                                        118
119 P00 08EB 8196    P00 08EB              119 loop    call    tog
120 P00 08ED 5191    P00 08ED              120         call    read
121 P00 08EF 0DCD0B  P00 08EF              121         ldi     orb,8
122 P00 08F2 BBD1    P00 08F2              122         set     5,acr
123 P00 08F4 F1AA    P00 08F4              123         call    fsound
124 P00 08F6 1FD1    P00 08F6              124 ld      ld      a,acr
125 P00 08F8 63FFFB  P00 08P8              125         jrr     6,a,ld
126 P00 08FB 1FD0    P00 08FB              126         ld      a,adat
127 P00 08FD 9F93    P00 08FD              127         ld      fsnd,a
128 P00 08FF 8196    P00 08FF              128         call    tog
129 P00 0201 5191    P00 0901              129         call    read
130 P00 0903 0DCD04  P00 0903              130         ldi     orb,4
131 P00 0906 BBD1    P00 0906              131         set     5,acr
132 P00 0908 A1B8    P00 0908              132         call    asound
133 P00 090A 1FD1    P00 090A              133 lp      ld      a,acr
134 P00 090C 63FFFB  P00 090C              134         jrr     6,a,lp
135 P00 090F 1FD0    P00 090F              135         ld      a,adat
136 P00 0911 9787    P00 0911              136         ld      asnd,a
137 P00 0913 B98B    P00 0913              137         jp      loop
138                                        138
139                                        139
140                                        140
141                                        141
142                                        142
143                                        143
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
144                                             144
145 P00   0915   0DD8FE   P00   0915            145 read    ldi    wdt,254
146 P00   0918   E3C12D   P00   0918            146         jrr    7,drb,rn
147 P00   091B   038427   P00   091B            147         jrr    0,flag,rpd
148 P00   091E   0B84     P00   091E            148         res    0,flag
149 P00   0920   1FAB     P00   0920            149         ld     a,togglab
;from LINE instead of absolute
150 P00   0922   9F99     P00   0922            150         ld     toggle,a
151 P00   0924   8196     P00   0924            151         call   tog
152 P00   0926   0DCD02   P00   0926            152         ldi    orb,2
153 P00   0929   BBD1     P00   0929            153         set    5,acr
154 P00   092B   C19B     P00   092B            154         call   time
155 P00   092D   03A002   P00   092D            155         jrr    0,sflag,rpb
156 P00   0930   FF9F     P00   0930            156         dec    cltmer
157 P00   0932   838402   P00   0932            157 rpb     jrr    1,flag,rpc
158 P00   0935   FF91     P00   0935            158         dec    tcntr
159 P00   0937   1FD1     P00   0937            159 rpc     ld     a,acr
160 P00   0939   63FFFB   P00   0939            160         jrr    6,a,rpc
161 P00   093C   1FD0     P00   093C            161         ld     a,adat
162 P00   093E   3704     P00   093E            162         cpi    a,4
163 P00   0940   12       P00   0940            163         jrnc   rpca
164 P00   0941   1704     P00   0941            164         ldi    a,4
165 P00   0943   9FA7     P00   0943            165 rpca    ld     tim,a
166 P00   0945   8196     P00   0945            166 rpd     call   tog
167 P00   0947   CD       P00   0947            167         ret
168 P00   0948   13841A   P00   0948            168 rn      jrs    0,flag,rnp
169 P00   094B   1B84     P00   094B            169         set    0,flag
170 P00   094D   1FAB     P00   094D            170         ld     a,toggleb
;from LINE
171 P00   094F   9F99     P00   094F            171         ld     toggle,a
172 P00   0951   8196     P00   0951            172         call   tog
173 P00   0953   0DCD01   P00   0953            173         ldi    orb,1
174 P00   0956   BBDI     P00   0956            174         set    5,acr
175 P00   0958   819D     P00   0958            175         call   mode
176 P00   095A   1198     P00   095A            176         call   comp
177 P00   095C   1FD1     P00   095C            177 rnd     ld     a,acr
178 P00   095E   63FFFB   P00   095E            178         jrr    6,a,rnd
179 P00   0961   1FD0     P00   0961            179         ld     a,adat
180 P00   0963   9F96     P00   0963            180         ld     mod,a
181 P00   0965   8196     P00   0965            181 rnp     call   tog
182 P00   0967   CD       P00   0967            182         ret
183                                             183
184                                             184
185                                             185
186                                             186
187                                             187
188                                             188
189                                             189
190                                             190
191                                             191
192                                             192
193                                             193
194                                             194
195                                             195
196 P00   0968   1F99     P00   0968            196 tog     ld     a,toggle
197 P00   096A   08       P00   096A            197         jrnz   toga
198 P00   096B   CD       P00   096B            198         ret
199 P00   096C   438406   P00   096C            199 toga    jrr    2,flag,togd
200 P00   096F   0DC073   P00   096F            200         ldi    dra,243
201 P00   0972   0DC0FF   P00   0972            201         ldi    dra,255
202 P00   0975   C38406   P00   0975            202 togd    jrr    3,flag,togn
203 P00   0978   0DC0FC   P00   0978            203         ldi    dra,252
204 P00   097B   0DC0FF   P00   097B            204         ldi    dra,255
205 P00   097E   FF99     P00   097E            205 togn    dec    toggle
206 P00   0980   CD       P00   0980            206         ret
207                                             207
208                                             208
209                                             209
210                                             210
211                                             211
212                                             212
213                                             213
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
P00  0981  1FBE     P00  0981   comp    ld    a,dead
P00  0983  14       P00  0983           jrz   compa
P00  0984  A99A     P00  0984           jp    compna
P00  0986  1FAS     P00  0986   compa   ld    a,aimp
P00  0988  3714     P00  0988           cpi   a,20
P00  098A  42       P00  098A           jrnc  compd
P00  098B  1FB2     P00  098B           ld    a,imptim
P00  098D  10       P00  098D           jrnz  compb
P00  098E  599A     P00  09SE           jp    compn
P00  0990  FFB2     P00  0990   compb   dec   imptim
P00  0992  CD       P00  0992           ret
P00  0993  1FB3     P00  0993   compd   ld    a,impcntr
P00  0995  38       P00  0995           jrnz  compf
P00  0996  0DB301   P00  0996           ldi   impcntr,1
P00  0999  0DB23C   P00  0999           ldi   imptim,60
P00  099C  CD       P00  099C           ret
P00  099D  1FB2     P00  099D   compf   ld    a,imptim
P00  099F  2C       P00  099F           jrz   compn
P00  09A0  FFB2     P00  09A0           dec   imptim
P00  09A2  7FB3     P00  09A2           inc   impcntr
P00  09A4  CD       P00  09A4           ret
P00  09A5  1FB3     P00  09A5   compn   ld    a,impcntr
P00  09A7  3704     P00  09A7           cpi   a,4
P00  09A9  4A       P00  09A9           jrnc  compp
P00  09AA  EB84     P00  09AA   compna  res   7,flag
P00  09AC  0DB300   P00  09AC           clr   impcntr
P00  09AF  0DB200   P00  09AF           clr   imptim
P00  09B2  CD       P00  09B2           ret
P00  09B3  FB84     P00  09B3   compp   set   7,flag
P00  09B5  0DB300   P00  09B5           clr   impcntr
P00  09B8  0DB200   P00  09B8           clr   imptim
P00  09BB  CD       P00  09BB           ret
P00  09BC  1FBE     P00  09BC   time    ld    a,dead
;transfer
P00  09BE  14       P00  09BE           jrz   tia
P00  09BF  FFBE     P00  09BF           dec   dead
P00  09C1  FF9B     P00  09C1   tia     dec   cyc
P00  09C3  0C       P00  09C3           jrz   tid
P00  09C4  CD       P00  09C4           ret
P00  09C5  1FBD     P00  09C5   tid     ld    a,max
P00  09C7  14       P00  09C7           jrz   tin
P00  09C8  FPBD     P00  09C8           dec   max
P00  09CA  FP9C     P00  09CA   tin     dec   sec
P00  09CC  0C       P00  09CC           jrz   tip
P00  09CD  CD       P00  09CD           ret
P00  09CE  1FA8     P00  09CE   tip     ld    a,secb   ;from
LINE
P00  09D0  9F9C     P00  09D0           ld    sec,a
P00  09D2  1F9A     P00  09D2           ld    a,tmin
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
284 P00 09D4 14      P00 09D4 284       jrz  tiz
285 P00 09D5 FF9A    P00 09D5 285       dec  tmin
286 P00 09D7 CD      P00 09D7 286 tiz   ret
287                           287
288                           288
289                           289
290                           290
291                           291
292                           292
293                           293
294                           294
295                           295
296                           296
297                           297
298                           298
299                           299
300                           300
301                           301
302                           302
303                           303
304                           304
305                           305
306 P00 09D8 1F96    P00 09D8 306 mode  ld   a,mod
307 P00 09DA 338405  P00 09DA 307       jrs  4,flag,moda
308 P00 09DD 3770    P00 09DD 308       cpi  a,112
309 P00 09DF 3A      P00 09DF 309       jrnc mnorm
310 P00 09E0 69A6    P00 09E0 310       jp   maway
311 P00 09E2 3790    P00 09E2 311 moda  cpi  a,144
312 P00 09E4 12      P00 09E4 312       jrnc mnorm
313 P00 09E5 69A6    P00 09ES 313       jp   maway
314 P00 09E7 2B84    P00 09E7 314 mnorm res  4,flag
315 P00 09E9 EBA0    P00 09E9 315       res  7,sflag
316 P00 09EB A3C10C  P00 09EB 316       jrr  S,drb,mnx
;option
317 P00 09EE ABB8    P00 09EE 317       res  5,nflg
318 P00 09P0 0DBD00  P00 09F0 318       clr  max
319 P00 09F3 0DBE3C  P00 09F3 319       ldi  dead,60
320 P00 09F6 0D9A00  P00 09F6 320       clr  tmin
321 P00 09F9 CD      P00 09F9 321       ret
322 P00 09FA 738404  P00 09FA 322 mnx   jrs  6,flag,mna
323 P00 09FD 1F84    P00 09FD 323       ld   a,flag
324 P00 09FF 9F95    P00 09FF 324       ld   dup,a
325 P00 0A01 539504  P00 0A01 325 mna   jrs  2,dup,mnd
326 P00 0A04 D39501  P00 0A04 326       jrs  3,dup,mnd
327 P00 0A07 CD      P00 0A07 327       ret
328 P00 0A08 E38419  P00 0A08 328 mnd   jrr  7,flag,mnf
329 P00 0A0B 1FAS    P00 0A0B 329       ld   a,secb
330 P00 0A0D 9F9C    P00 0A0D 330       ld   sec,a
331 P00 0A0F 1FA7    P00 0A0F 331       ld   a,tim
332 P00 0A11 9F9A    P00 0A11 332       ld   tmin,a
333 P00 0A13 439502  P00 0A13 333       jrr  2,dup,mndc
334 P00 0A16 SB84    P00 0A16 334       set  2,flag
335 P00 0A18 0D9D02  P00 0A18 335 mndc  ldi  bcntrh,2
336 P00 0A1B 1FAC    P00 0A1B 336       ld   a,bcntrlb
;from LINE
337 P00 0A1D 9F9E    P00 0A1D 337       ld   bcntrl,a
338 P00 0A1F AB84    P00 0A1F 338       res  5,flag
339 P00 0A21 6B84    P00 0A21 339       res  6,flag
340 P00 0A23 CD      P00 0A23 340       ret
341 P00 0A24 B38431  P00 0A24 341 mnf   jrs  5,flag,mnt
342 P00 0A27 1F9A    P00 0A27 342       ld   a,tmin
343 P00 0A29 3701    P00 0A29 343       cpi  a,1
344 P00 0A2B 28      P00 0A2B 344       jrnz mnfa
345 P00 0A2C 1F9C    P00 0A2C 345       ld   a,sec
346 P00 0A2E 3701    P00 0A2E 346       cpi  a,1
347 P00 0A30 0C      P00 0A30 347       jrz  mng
348 P00 0A31 CD      P00 0A31 348 mnfa  ret
349 P00 0A32 7B84    P00 0A32 349 mng   set  6,flag
350 P00 0A34 IF9E    P00 0A34 350       ld   a,bcntrl
351 P00 0A36 30      P00 0A36 351       jrnz umn
352 P00 0A37 1FAC    P00 0A37 352       ld   a,bcntrlb
;from LINE
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
353 P00 0A39 9F9E    P00 0A39   353        ld    bcntrl,a
354 P00 0A3B FF9D    P00 0A3B   354        dec   bcntrh
355 P00 0A3D 1F9E    P00 0A3D   355 mnn    ld    a,bcntrl
356 P00 0A3F 3fAD    P00 0A3F   356        cp    a,cntrlb   ;from
LINE
357 P00 0A41 3E      P00 0A41   357        jrc   mnp
358 P00 0A42 439509  P00 0A42   358        jrr   2,dup,mnr
359 P00 0A45 SB84    P00 0A45   359        set   2,flag
360 P00 0A47 E9A4    P00 0A47   360 mnnb   jp    mnr
361 P00 0A49 439502  P00 0A49   361 mnp    jrr   2,dup,mnr
362 P00 0A4C 4B84    P00 0A4C   362        res   2,flag
363 P00 0A4E FF9E    P00 0A4E   363 mnr    dec   bcntrl
364 P00 0A50 1F9D    P00 0A50   364        ld    a,bcntrh
365 P00 0A52 20      P00 0A52   365        jrnz  mns
366 P00 0A53 BB84    P00 0A53   366        set   5,flag
367 P00 0A55 6B84    P00 0A55   367        res   6,flag
368 P00 0A57 CD      P00 0A57   368 mns    ret
369 P00 0A58 1F9A    P00 0A58   369 mnt    ld    a,tmin
370 P00 0A5A 50      P00 0A5A   370        jrnz  mnu
371 P00 0A5B 4B84    P00 0A5B   371        res   2,flag
372 P00 0A5D CB84    P00 0A5D   372        res   3,flag
373 P00 0A5P AB84    P00 0A5F   373        res   S,flag
374 P00 0A61 6B84    P00 0A61   374        res   6,flag
375 P00 0A63 EBA0    P00 0A63   375        res   7,sflag
376 P00 0A65 CD      P00 0A65   376 mnu    ret
377                             377
378                             378
379                             379
380 P00 0A66 3B84    P00 0A66   380 maway  set   4,flag
381 P00 0A68 FBA0    P00 0A68   381        set   7,sflag
382 P00 0A6A 1FBE    P00 0A6A   382        ld    a,dead
383 P00 0A6C 3C      P00 0A6C   383        jrz   mab
384 P00 0A6D 4B84    P00 0A6D   384        res   2,flag
385 P00 0A6F CB84    P00 0A6F   385        res   3,flag
386 P00 0A71 EB84    P00 0A71   386        res   7,flag
387 P00 0A73 CD      P00 0A73   387        ret
388 P00 0A74 E38418  P00 0A74   388 mab    jrr   7,flag,mad
389 P00 0A77 5B84    P00 0A77   389        set   2,flag
390 P00 0A79 DB84    P00 0A79   390        set   3,flag
391 P00 0A7B 1FA8    P00 0A7B   391        ld    a,secb
392 P00 0A7D 9F9C    P00 0A7D   392        ld    sec,a
393 P00 0A77 1FA7    P00 0A7F   393        ld    a,tim
394 P00 0A81 9F9A    P00 0A81   394        ld    tmin,a
395 P00 0A83 B3B819  P00 0A83   395        jrs   5,nflg,maf
396 P00 0A86 BBB8    P00 0A86   396        set   5,nflg
397 P00 0A88 0DBDD2  P00 0A88   397        ldi   max,210
398 P00 0A8B 0DBE00  P00 0A8B   398        clr   dead
399 P00 0A8E CD      P00 0A8E   399        ret
400 P00 0A8F 1F9A    P00 0A8F   400 mad    ld    a,tmin
401 P00 0A91 68      P00 0A91   401        jrnz  maf
402 P00 0A92 4B84    P00 0A92   402        res   2,flag
403 P00 0A94 CB84    P00 0A94   403        res   3,flag
404 P00 0A96 ABB8    P00 0A96   404        res   5,nflg
405 P00 0A98 0DBD00  P00 0A98   405        clr   max
406 P00 0A9B 0DBE00  P00 0A9B   406        clr   dead
407 P00 0A9E CD      P00 0A9E   407        ret
408 P00 0A9F 1FBD    P00 0A9F   408 maf    ld    a,max
409 P00 0AA1 60      P00 0AA1   409        jrnz  man
410 P00 0AA2 0DBE3C  P00 0AA2   410        ldi   dead,60
411 P00 0AA5 4B84    P00 0AA5   411        res   2,flag
412 P00 0AA7 CB84    P00 0AA7   412        res   3,flag
413 P00 0AA9 ABB8    P00 0AA9   413        res   5 nflg
414 P00 0AAB 0D9A00  P00 0AAB   414        clr   tmin
415 P00 0AAE CD      P00 0AAE   415 man    ret
416                             416
417                             417
418                             418
419                             419
420                             420
421                             421
422                             422
423                             423
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
424                                  424
425                                  425
426 P00 0AAF 1F93     P00 0AAF       426 fsound  ld    a,fsnd
427 P00 0AB1 9F8E     P00 0AB1       427         ld    flenv,a
428 P00 0AB3 11B5     P00 0AB3       428         call  track
429 P00 0AB5 1F8E     P00 0AB5       429 fcomp   ld    a,flenv
430 P00 0AB7 E3A009   P00 0AB7       430         jrr   7,sflag,fce
;from MODE
431 P00 0ABA 8B84     P00 0ABA       431         res   1,flag
432 P00 0ABC 0D9100   P00 0ABC       432         clr   tcntr
433 P00 0ABF 0D9F00   P00 0ABF       433         clr   cltmer
434 P00 0AC2 CD       P00 0AC2       434         ret
435 P00 0AC3 938424   P00 0AC3       435 fce     jrs   1,flag,fcp
436 P00 0AC6 1F8E     P00 0AC6       436         ld    a,flenv
437 P00 0AC8 3740     P00 0AC8       437         cpi   a,64
438 P00 0ACA 12       P00 0ACA       438         jrnc  fcea
439 P00 0ACB 49AE     P00 0ACB       439         jp    fcn
440 P00 0ACD 9FB9     P00 0ACD       440 fcea    ld    fdiff,a
441 P00 0ACF 1F9F     P00 0ACF       441         ld    a,cltmer
442 P00 0AD1 2C       P00 0AD1       442         jrz   fcf
443 P00 0AD2 3FA9     P00 0AD2       443         cp    a,tcntrb   ;from
LINE
444 P00 0AD4 12       P00 0AD4       444         jrnc  fcf
445 P00 0AD5 A9AE     P00 0AD5       445         jp    fcp
446 P00 0AD7 9B84     P00 0AD7       446 fcf     set   1,flag
447 P00 0AD9 1BB8     P00 0AD9       447         set   0,nflg
448 P00 0ADB 5BB8     P00 0ADB       448         set   2,nflg
449 P00 0ADD 7BA0     P00 0ADD       449         set   6,sflag
450 P00 0ADF 1FA9     P00 0ADF       450         ld    a,tcntrb
;from LINE
451 P00 0AE1 9F91     P00 0AE1       451         ld    tcntr,a
452 P00 0AE3 CD       P00 0AE3       452         ret
453 P00 0AE4 8BB4     P00 0AE4       453 fcn     res   1,flag
454 P00 0AE6 6BA0     P00 0AE6       454         res   6,sflag
455 P00 0AE8 19B3     P00 0AE8       455         jp    fsend
456 P00 0AEA 1F91     P00 0AEA       456 fcp     ld    a,tcntr
457 P00 0AEC 0C       P00 0AEC       457         jrz   fcz
458 P00 0AED CD       P00 0AED       458         ret
459 P00 0AEE 8B84     P00 0AEE       459 fcz     res   1,flag
460 P00 0AF0 0BB8     P00 0AF0       460         res   0,nflg
461 P00 0AF2 63A03C   P00 0AF2       461         jrr   6,sflag,fsend
462                                  462
463                                  463
464                                  464
465                                  465
466                                  466
467 P00 0AF5 13A01C   P00 0AF5       467 fstore  jrs   0,sflag,fstd
468 P00 0AF8 1BA0     P00 0AF8       468         set   0,sflag
469 P00 0AFA 23C106   P00 0AFA       469         jrr   4,drb,fsta
470 P00 0AFD 1FAA     P00 0AFD       470         ld    a,cltmerb
;from LINE
471 P00 0AFF 9F9F     P00 0AFF       471         ld    cltmer
472 P00 0B01 79B0     P00 0B01       472         jp    fstb
473 P00 0B03 1FB1     P00 0B03       473 fsta    ld    a,cltmerc
474 P00 0B08 9F9F     P00 0B08       474         ld    cltmerc
475 P00 0B07 0D81B4   P00 0B07       475 fstb    ldi   y,180
476 P00 0B0A 1F9B     P00 0B0A       476         ld    a,cyc
477 P00 0B0C 9FA1     P00 0B0C       477         ld    diff,a
478 P00 0B0E 0DA2FF   P00 0B0E       478         ldi   dpk,255
479 P00 0B11 9BA3     P00 0B11       479         set   1,word
480 P00 0B13 CD       P00 0B13       480         ret
481 P00 0B14 1FA1     P00 0B14       481 fstd    ld    a,diff
482 P00 0B16 DF9B     P00 0B16       482         sub   a,cyc
483 P00 0B18 3FA2     P00 0B18       483         cp    a,dpk
484 P00 0B1A 12       P00 0B1A       484         jrnc  fstf
485 P00 0B1B 9FA2     P00 0B1B       485         ld    dpk,a
486 P00 0B1D 8F       P00 0B1D       486 fstf    ld    (y),a
487 P00 0B1E 75       P00 0B1E       487         ld    a,y
488 P00 0B1F 37B7     P00 0B1F       488         cpi   a,183
489 P00 0B21 0A       P00 0B21       489         jrnc  fstg
490 P00 0B22 55       P00 0B22       490         inc   y
491 P00 0B23 1F9B     P00 0B23       491 fstg    ld    a,cyc
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
 492  P00   0B25   9FA1      P00   0B25      492              ld      diff,a
 493  P00   0B27   1F9F      P00   0B27      493              ld      a,cltmer
 494  P00   0B29   3FAE      P00   0B29      494              cp      a,cltb    ;from
LINE
 495  P00   0B2B   22 P00    0B2B  495              jrnc      fsth
 496  P00   0B2C   5FAF P00  0B2C  496              add       a,cltab-
                                                                ;from
LINE
 497  P00   0B2E   9F9F      P00   0B2E      497              ld      cltmer,a
 498  P00   0B30   CD        P00   0B30      498 fsth         ret
 499                                         499
 500                                         500
 501                                         501
 502  P00   0B31   03A01C    P00   0B31      502 fsend        jrr     0,sflag,feendx
 503  P00   0B34   1F9F      P00   0B34      503              ld      a,cltmer
 504  P00   0B36   0C        P00   0B36      504              jrz     fsa
 505  P00   0B37   CD        P00   0B37      505              ret
 506  P00   0B38   0BA0      P00   0B38      506 fsa          res     0,sflag
 507  P00   0B3A   4BB8      P00   0B3A      507              res     2,nflg
 508  P00   0B3C   93B80F    P00   0B3C      508              jrs     1,nflg,fsb
 509  P00   0B3F   75        P00   0B3F      509              ld      a,y
 510  P00   0B40   37B4      P00   0B40      510              cpi     a,180
 511  P00   0B42   10        P00   0B42      511              jrnz    fsaa
 512  P00   0B43   09B5      P00   0B43      512              jp      fsendx
 513  P00   0B45   9BA0      P00   0B45      513 fsaa         set     1,sflag
 514  P00   0B47   37B5      P00   0B47      514              cpi     a,181
 515  P00   0B49   30        P00   0B49      515              jrnz    fsendx
 516  P00   0B4A   1FAF      P00   0B4A      516              ld      a,cltab   ;from
LINE
 517  P00   0B4C   9FA2 P00  0B4C  517                ld        dpk,a
 518  P00   0B4E   8BB8 P00  0B4E  518           fsb res        1,nflg
 519  P00   0B50   CD P00    0B50  519        fsendx ret
 520                                         520
 521                                         521
 522  P00   0B51   03BB16    P00   0B51      522 track        jrr     0,nflg,trn
 523  P00   0B54   0DBA00    P00   0B54      523 trca         clr     ncntr
 524  P00   0B57   178E      P00   0B57      S24              ld      a,flenv
 525  P00   0859   3FB9      P00   0B59      S25              CP      a,fdiff
 526  P00   0B5B   16        P00   0B5B      526              jrc     tra
 527  P00   0B5C   9FB9      P00   0B8C      527              ld      fdiff,a
 528  P00   0B5E   1FB9      P00   0B5E      528 tra          ld      a,fdiff
 529  P00   0B60   3792      P00   0B60      S29              cpi     a,146
 530  P00   0B62   12        P00   0B62      S30              jrnc    trb
 531  P00   0B63   1792      P00   0B63      531              ldi     a,146
 532  P00   0B65   D782      P00   0B65      S32 trb          subi    a,130
 533  P00   0B67   9FBC      P00   0B67      S33              ld      floor,a
 534  P00   0B69   CD        P00   0B69      S34 trd          ret
 535                                         535
 536                                         536
 537                                         537
 538                                         538
 539                                         539
 540  P00   0B6A   43B81C    P00   0B6A      540 trn          jrr     2,nflg,trz
 541  P00   0B6D   1P8E      P00   0B6D      541              ld      a,flenv
 542  P00   0B6F   3FBB      P00   0B6F      542              cp      a,delt
 543  P00   0B71   12        P00   0B71      543              jrnc    trna
 544  P00   0B72   59B8      P00   0B72      544              jp      trp
 545  P00   0B74   3708      P00   0B74      545 trna         cpi     a,8
 546  P00   0B76   12        P00   0B76      546              jrnc    trnb
 547  P00   0B77   59B8      P00   0B77      547              jp      trp
 548  P00   0B79   3FBC      P00   0B79      548 trnb         cp      a,floor
 549  P00   0B7B   4E        P00   0B7B      549              jrc     trp
 550  P00   0B7C   7FBA      P00   0B7C      550              inc     ncntr
 551  P00   0B7E   1PBA      P00   0B7E      551              ld      a,ncntr
 552  P00   0B80   3710      P00   0B80      552              cpi     a,16
 553  P00   0B82   16        P00   0B82      553              jrc     trp
 554  P00   0B83   9BB8      P00   0B83      554              get     1,nflg
 555  P00   0B85   1F8E      P00   0B8S      555 trp          ld      a,flenv
 556  P00   0B87   9FBB      P00   0B87      556              ld      delta
 557  P00   0B89   CD        P00   0B89      557 trz          ret
 558                                         558
 559                                         559
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
P00  0B8A  1F98     P00  0B8A  asound  ld    a,acntr
P00  0B8C  54       P00  0B8C          jrz   asd
P00  0B8D  FF98     P00  0B8D          dec   acntr
P00  0B8F  1F87     P00  0B8F          ld    a,asnd
P00  0B91  3F8B     P00  0B91          cp    a,apk
P00  0B93  16       P00  0B93          jrc   asb
P00  0B94  9F8B     P00  0B94          ld    apk,a
P00  0B96  CD       P00  0B96  asb     ret
P00  0B97  1F8C     P00  0B97  asd     ld    a,ecntr
P00  0B99  4C       P00  0B99          jrz   asg
P00  0B9A  1F8B     P00  0B9A          ld    a,apk
P00  0B9C  3F94     P00  0B9C          cp    a,alpk
P00  0B9E  16       P00  0B9E          jrc   asc
P00  0B9F  9F94     P00  0B9F          ld    alpk,a
P00  0BA1  89BA     P00  0BA1  asc     jp    asn
P00  0BA3  D1C3     P00  0BA3  asg     call  atrack
P00  0BA5  0D9400   P00  0BA5          clr   alpk
P00  0BA8  61C5     P00  0BA8  asn     call  anv
P00  0BAA  0D9804   P00  0BAA          ldi   acntr,4
P00  0BAD  0D8B00   P00  0BAD          clr   apk
P00  0BB0  1F90     P00  0BB0          ld    a,alenv
P00  0BB2  DF88     P00  0BB2          sub   a,aenv
P00  0BB4  22       P00  0BB4          jrnc  acd
P00  0BB5  0DA500   P00  0BB5          clr   aimp
P00  0BB8  CD       P00  0BB8          ret
P00  0BB9  9FAS     P00  0BB9  acd     ld    aimp,a
P00  0BBB  F3A068   P00  0BBB          jrs   7,sflag,aclr
P00  0BBE  93A001   P00  0BBE          jrs   1,sflag,ashift
P00  0BC1  CD       P00  0BC1          set
P00  0BC2  53A005   P00  0BC2  ashift  jrs   2,sflag,asha
P00  0BC5  SBA0     P00  0BC5          set   2,sflag
P00  0BC7  0D81B4   P00  0BC7          ldi   y,180
P00  0BCA  0F       P00  0BCA  asha    ld    a,(y)
P00  0BCB  DFA2     P00  0BCB          sub   a,dpk
P00  0BCD  1A       P00  0BCD          jrnc  ashd
P00  0BCE  2D       P00  0BCE          com   a
P00  0BCF  7FFF     P00  0BCF          inc   a
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
632 P00 0BD1 3FB0    P00 0BD1   632 ashd  cp   a,tolb ;from
LINE
633 P00 0BD3 22      P00 0BD3   633       jrnc ashf
634 P00 0BD4 1BA3    P00 0BD4   634       set  0,word
635 P00 0BD6 A9BD    P00 0BD6   635       jp   ashn
636 P00 0BD8 0BA3    P00 0BD8   636 ashf  res  0,word
637 P00 0BDA 1FA3    P00 0BDA   637 ashn  ld   a,word
638 P00 0BDC 5FFF    P00 0BDC   638       sla  a
639 P00 0BDE 9FA3    P00 0BDE   639       ld   word,a
640 P00 0BE0 A3A358  P00 0BE0   640       jrr  5,word,aclrn
641 P00 0BE3 1FA3    P00 0BE3   641       ld   a,word
642 P00 0BE5 23C120  P00 0BE5   642       jrr  4,drb,ashr
643 P00 0BE8 3730    P00 0BE8   643       cpi  a,48
644 P00 0BEA 68      P00 0BEA   644       jrnz ashp
645 P00 0BEB 538406  P00 0BEB   645       jrs  2,flag,ashna
646 P00 0BEE SB84    P00 0BEE   646       set  2,flag
647 P00 0BF0 FB84    P00 0BF0   647       set  7,flag
648 P00 0BF2 69C2    P00 0BF2   648       jp   aclr
649 P00 0BF4 4B84    P00 0BF4   649 ashna res  2,flag
650 P00 0BF6 69C2    P00 0BF6   650       jp   aclr
651 P00 0BF8 3738    P00 0BF8   651 ashp  cpi  a,56
652 P00 0BFA 58      P00 0BFA   652       jrnz ashq
653 P00 0BFB D38406  P00 0BFB   653       jrs  3,flag,ashpa
654 P00 0BFE DB84    P00 0BFE   654       set  3,flag
655 P00 0C00 FB84    P00 0C00   655       set  7,flag
656 P00 0C02 69C2    P00 0C02   656       ip   aclr
657 P00 0C04 CB84    P00 0C04   657 ashpa res  3,flag
658 P00 0C06 69C2    P00 0C06   658 ashq  jp   aclr
659 P00 0C08 3738    P00 0C08   659 ashr  cpi  a,56
660 P00 0C0A 68      P00 0C0A   660       jrnz asht
661 P00 0C0B 538406  P00 0C0B   661       jrs  2,flag,ashra
662 P00 0C0E 5B84    P00 0C0E   662       set  2,flag
663 P00 0C10 FB84    P00 0C10   663       set  7,flag
664 P00 0C12 69C2    P00 0C12   664       jp   aclr
665 P00 0C14 4B84    P00 0C14   665 ashra res  2,flag
666 P00 0C16 69C2    P00 0C16   666       jp   aclr
667 P00 0C18 373C    P00 0C1S   667 asht  cpi  a,60
668 P00 0C1A 58      P00 0C1A   668       jrnz aclr
669 P00 0C1B D38406  P00 0C1B   669       jrs  3,flag,aghta
670 P00 0C1E DB84    P00 0C1E   670       set  3,flag
671 P00 0C20 PB84    P00 0C20   671       set  7,flag
672 P00 0C22 69C2    P00 0C22   672       jp   aclr
673 P00 0C24 CB84    P00 0C24   673 ashta res  3,flag
674 P00 0C26 0DA300  P00 0C26   674 aclr  clr  word
675 P00 0C29 0DA604  P00 0C29   675       ldi  tempa,4
676 P00 0C2C 0D81B4  P00 0C2C   676       ldi  y,180
677 P00 0C2F DFFF    P00 0C2F   677 aclrd clr  a
678 P00 0C31 8F      P00 0C31   678       ld   (y),a
679 P00 0C32 55      P00 0C32   679       inc  y
680 P00 0C33 FFA6    P00 0C33   680       dec  tempa
681 P00 0C35 C8      P00 0C35   681       jrnz aclrd
682 P00 0C36 8BA0    P00 0C36   682       res  1,sflag
683 P00 0C38 4BA0    P00 0C38   683       res  2,sflag
684 P00 0C3A CD      P00 0C3A   684       ret
685 P00 0C3B 55      P00 0C3B   685 aclrn inc  y
686 P00 0C3C CD      P00 0C3C   686       ret
687                             687
688                             688
689                             689
690                             690
691                             691
692                             692
693                             693
694                             694
695                             695
696                             696
697                             697
698                             698
699                             699
700                             700
701                             701
702                             702
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
703                                       703
704                                       704
705 P00  0C3D  1F94     P00  0C3D         705 atrack  ld    a,alpk
706 P00  0C3F  3F88     P00  0C3F         706         cp    a,aenv
707 P00  0C41  52       P00  0C41         707         jrnc  atn
708 P00  0C42  1F88     P00  0C42         708         ld    a,aenv
709 P00  0C44  D708     P00  0C44         709         subi  a,8
710 P00  0C46  12       P00  0C46         710         jrnc  atd
711 P00  0C47  1700     P00  0C47         711         ldi   a,0
712 P00  0C49  9F88     P00  0C49         712 atd     ld    aenv,a
713 P00  0C4B  CD       P00  0C4B         713         ret
714 P00  0C4C  1F88     P00  0C4C         714 atn     ld    a,aenv
715 P00  0C4E  5701     P00  0C4E         715         addi  a,1
716 P00  0C50  12       P00  0C50         716         jrnc  atp
717 P00  0C51  17FF     P00  0C51         717         ldi   a,255
718 P00  0C53  9F88     P00  0C53         718 atp     ld    aenv,a
719 P00  0C55  CD       P00  0C55         719         ret
720                                       720
721                                       721
722                                       722
723                                       723
724                                       724
725 P00  0C56  IFBB     P00  0C56         725 anv     ld    a,apk
726 P00  0C58  3F90     P00  0C58         726         cp    a,alenv
727 P00  0C5A  52       P00  0C5A         727         jrnc  anvn
728 P00  0C5B  1F90     P00  0C5B         728         ld    a,alenv
729 P00  0C5D  D702     P00  0C5D         729         subi  a,2
730 P00  0C5F  12       P00  0C5F         730         jrnc  anva
731 P00  0C60  1700     P00  0C60         731         ldi   a,0
732 P00  0C62  9F90     P00  0C62         732 anva    ld    alenv.a
733 P00  0C64  CD       P00  0C64         733         ret
734 P00  0C65  1790     P00  0C65         734 anvn    ld    a,alenv
735 P00  0C67  5708     P00  0C67         735         addi  a,8
736 P00  0C69  12       P00  0C69         736         jrnc  anvp
737 P00  0C6A  17FF     P00  0C6A         737         ldi   a,255
738 P00  0C6C  9F90     P00  0C6C         738 anvp    ld    alenv,a
739 P00  0C6E  CD       P00  0C6E         739         ret
740                                       740
741                                       741
742                                       742
743                                       743
744                                       744
745                                       745
746                                       746
747                                       747
748                                       748
749                                       749
750 P00  0C6F  0DSC78   P00  0C6F         750 line    ldi   ecntr,120
;read line freq. for 2 sec.
751 P00  0C72  E3C1FD   P00  0C72         751 linea   jrr   7,drb,linea
;start at leading edge
752 P00  0C75  0DA600   P00  0C75         752         clr   tempa
753 P00  0C78  0DD3FF   P00  0C78         753 lined   ldi   tcr,255
754 P00  0C7B  0DD438   P00  0C7B         754         ldi   tscr,56
755 P00  0C7E  E3C109   P00  0C7E         755 linef   jrr   7,drb,linen   ;2
Byte count at 2.167microsec. rate
756 P00  0C81  1FD4     P00  0C81         756         ld    a,tscr
757 P00  0C83  E3FFF8   P00  0C83         757         jrr   7,a,linef
758 P00  0C86  7FA6     P00  0C86         758         inc   tempa
759 P00  0C88  89C7     P00  0C88         759         jp    lined
760 P00  0C8A  0DD8FE   P00  0C8A         760 linen   ldi   wdt,254
761 P00  0C8D  FF8C     P00  0C8D         761         dec   ecntr   ;loop
until done
762 P00  0C8F  14 P00   0C8F  762                jrz   linep
763 P00  0C90  29C7 P00 0C90  763                jp    linea
764 P00  0C92  CBD4 P00 0C92  764        linep   res   3,tscr-
                                                             ;stop
counter
765 P00  0C94  1FD3 P00 0C94  765                ld    a,tcr
766 P00  0C96  2D P00   0C96  766                com   a
767 P00  0C97  37BE P00 0C97  767                cpi   a,190   ;center
point 2 Byte compare
```

APPENDIX A-continued

Assembler Listing for ROM Source Code of One Embodiment of Program Stored in Microcontroller 58

ST6 MACRO-ASSEMBLER version 3.01 - August 1990
Copyright 1993 Joseph Enterprises
--- SOURCE FILE : smclp3.asm ---

```
 768 P00 0C99 12     P00 0C99 768       jrnc liner
 769 P00 0C9A FFA6   P00 0C9A 769       dec  tempa
 770 P00 0C9C 1FA6   P00 0C9C 770 liner ld   a,tempa
 771 P00 0C9E 3710   P00 0C9E 771       cpi  a,16
 772 P00 0CA0 12     P00 0CA0 772       jrnc lines   ;jp to
50hz. buffer loading
 773 P00 0CA1 89CC   P00 0CA1 773       jp   linet   ;jp to
60hz. buffer loading
 774 P00 0CA3 0DA802 P00 0CA3 774 lines ldi  secb,2  ;buffer
registers to load timing reg.
 775 P00 0CA6 0D9C02 P00 0CA6 775       ldi  sec,2   ;instead
of absolute values
 776 P00 0CA9 0DA90A P00 0CA9 776       ldi  tcntrb,10
 777 P00 0CAC 0DAA4B P00 0CAC 777       ldi  cltmerb,75
 778 P00 0CAF 0DB164 P00 0CAF 778       ldi  cltmerc,100
 779 P00 0CB2 0DAB20 P00 0CB2 779       ldi  toggleb,32
 780 P00 0CB5 0DAC32 P00 0CB5 780       ldi  bcntrlb,50
 781 P00 0CB8 0DAD19 P00 0CB8 781       ldi  cntrlb,25
 782 P00 0CBB 0DAE37 P00 0CBB 782       ldi  cltb,55
 783 P00 0CBE 0DAF1D P00 0CBE 783       ldi  cltab,29
;changed
 784 P00 0CC1 0DB00A P00 0CC1 784       ldi  tolb,10
;changed
 785 P00 0CC4 0DD430 P00 0CC4 785       ldi  tscr,48
 786 P00 0CC7 CD     P00 0CC7 786       ret
 787 P00 0CC8 0DA802 P00 0CC8 787 linet ldi  secb,2  ;same
 788 P00 0CCB 0D9C02 P00 0CCB 788       ldi  sec,
 789 P00 0CCE 0DA90C P00 0CCE 789       ldi  tcntrb,12
 790 P00 0CD1 0DAA5A P00 0CD1 790       ldi  cltmerb,90
 791 P00 0CD4 0DB178 P00 0CD4 791       ldi  cltmerc,120
 792 P00 0CD7 0DAB18 P00 0CD7 792       ldi  toggleb,24
 793 P00 0CDA 0DAC3C P00 0CDA 793       ldi  bcntrlb,60
 794 P00 0CDD 0DAD1E P00 0CDD 794       ldi  cntrlb,30
 795 P00 0CE0 0DAE42 P00 0CE0 795       ldi  cltb,66
 796 P00 0CE3 0DAF23 P00 0CE3 796       ldi  cltab,35
;changed
 797 P00 0CE6 0DB00D P00 0CE6 797       ldi  tolb,13
;changed
 798 P00 0CE9 0DD430 P00 0CE9 798       ldi  tscr,48
 799 P00 0CEC CD     P00 0CEC 799       ret
 800                          800
 801                          801
 802                          802
 803                          803
 804                          804
 805                          805
 806                          806
 807                          807
 808                          808
 809                          809
 810                          810
 811                          811
 812                          812
 813                          813
 814                          814       .org 0ffeh
 815 P00 0FFE 0988   P00 0FFE 815       jp   start
 816                          816
 817                          817
 818                          818
 819                          819
 820                          820
 821                          821
 822                          822
 823                          823
 824                          824
No error detected
No warning
```

What is claimed is:

1. An acoustic switch comprising:

a sound detector for producing electrical acoustic signals in response to a series of acoustic signals; a filter coupled to the sound detector for filtering, from the electrical acoustic signals, signals that correspond to acoustic signals outside a predetermined frequency range thus producing filtered acoustic signals;

a power switch; and a master control device coupled to the filter means and the power switch, the master control device comprising a second filter for rejecting, from the filtered acoustic signals, signals that are below a threshold voltage level thus producing sample signals and means for recognizing from the sample signals a first series of acoustic signals and a second series of acoustic signals different than the first series of acoustic signals and for operating the power switch upon receipt of one of the first and the second series of acoustic signals, the master control device further comprising means for establishing a time window when a first one of the sample signals passes through the second filter, wherein the recognizing means includes means for computing a number of the sample signals received within the time window, the first series of acoustic signals comprising a first predetermined number of the sample signals and the second series of acoustic signals comprising a second predetermined number of the sample signals.

2. The apparatus set forth in claim 1 wherein the predetermined frequency range is set to filter out acoustic signals unrelated to a clap.

3. The apparatus set forth in claim 1 wherein the predetermined frequency range is centered at approximately 2500 hertz.

4. The apparatus set forth in claim 1 wherein the first series of acoustic signals comprises a first sound signal repeated a first number of times and wherein the second series of acoustic signals comprises a sound signal substantially identical to the first sound signal repeated a second number of times different than the first number.

5. The apparatus set forth in claim 1 wherein the first series of acoustic signals is a first sound signal repeated in a first particular timing sequence and wherein the second series of acoustic signals is a sound signal substantially identical to the first sound signal repeated in a second particular timing sequence different than the first timing sequence.

6. The acoustic switch of claim 1 further comprising means for rejecting the sample signals if a threshold number of the sample signals are received in a predetermined period of time such that the rejected sample signals are discarded as background noise.

7. An acoustic switch comprising:

a sound detector for producing electrical acoustic signals in response to a series of acoustic signals; a filter coupled to the sound detector for filtering, from the electrical acoustic signals, signals that correspond to acoustic signals outside a predetermined frequency range thus producing filtered acoustic signals;

a power switch; and a master control device coupled to the filter means and the power switch, the master control device comprising a second filter for rejecting, from the filtered acoustic signals, signals that are below a threshold voltage level thus producing sample signals and means for recognizing from the sample signals a first series of acoustic signals and a second series of acoustic signals different than the first series of acoustic signals and for operating the power switch upon receipt of one of the first and the second series of acoustic signals, the master control device further comprising means for computing an amount of time that lapses between the sample signals; and means for determining whether the amount of time is greater than a threshold level so to ensure that the sample signals are adequately spaced apart.

8. An acoustic switch comprising:

a microphone for producing electrical acoustic signals from a series of acoustic signals;

a filter coupled to an output of the microphone for producing filtered acoustic signals from the electrical acoustic signals, the filtered acoustic signals comprising only components within a predetermined frequency range;

a first power switch having its operation responsive to an assertion of a first switch signal;

a second power switch having its operation responsive to an assertion of a second switch signal; and a master control device comprising:

an input to receive the filtered acoustic signals;

a first output for carrying the first switch signal coupled to the first power switch;

a second output for carrying the second switch signal coupled to the second power switch;

means for establishing a predetermined time window when a first one of the filtered acoustic signals is received by the input;

means for recognizing a first series of acoustic signals and a second series of acoustic signals different from the first series of acoustic signals based solely on a number of filtered acoustic signals received by the input within the predetermined time window; and means for asserting the first switch signal upon recognition of the first series of acoustic signals and asserting the second switch signal upon recognition of the second series of acoustic signals.

9. The acoustic switch of claim 8 wherein the master control device further comprises:

means for determining whether the filtered acoustic signals are above a threshold voltage level;

a second filter for filtering, from the filtered acoustic signals, signals that are below the threshold voltage level thus producing sample signals; and means for rejecting the sample signals if a threshold number of the sample signals is received in a predetermined period of time such that the sample signals are discarded as background noise.

10. A method for operating a first electrical power switch and a second electrical power switch comprising the steps of:

producing, with a sound detector, an analog sound signal from a series of acoustic signals;

filtering the analog sound signal to eliminate components of the analog sound signal that correspond to components outside a predetermined frequency range;

establishing a predetermined time window when a first of the filtered sound signal is received;

recognizing, from the filtered sound signal, a first series of acoustic signals and a second series of acoustic signals different from the first series of acoustic signals based on a number of filtered sound signals received within the predetermined time window;

operating the first electrical power switch upon recognition of the first series of acoustic signals; and operating the second electrical power switch upon recognition of the second series of acoustic signals.

11. The method of claim 10 further comprising:

determining whether the filtered acoustic signals are above a threshold voltage level;

filtering, from the filtered acoustic signals, signals that are below the threshold voltage level thus producing sample signals; and rejecting the sample signals if a threshold number of the sample signals is received in a predetermined period of time.

12. The method of claim 11 wherein the recognizing step further comprises:

determining a time period between successive filtered acoustic signals; and rejecting the filtered acoustic signals if the time period is greater than a threshold time to ensure that the filtered acoustic signals are adequately spaced apart.

* * * * *